(12) United States Patent
Kaukovuori et al.

(10) Patent No.: US 8,526,388 B1
(45) Date of Patent: Sep. 3, 2013

(54) INTERFERENCE CONTROL

(71) Applicant: Renesas Mobile Corporation, Tokyo (JP)

(72) Inventors: Jouni Kristian Kaukovuori, Vantaa (FI); Antti Oskari Immonen, Helsinki (FI); Jukka Tapio Ranta, Kaarina (FI)

(73) Assignee: Renesas Mobile Corporation, Tokyo (JP)

(*) Notice: Subject to any disclaimer, the term of this patent is extended or adjusted under 35 U.S.C. 154(b) by 0 days.

(21) Appl. No.: 13/682,955

(22) Filed: Nov. 21, 2012

(30) Foreign Application Priority Data

Mar. 23, 2012 (GB) .................................. 1205166.0

(51) Int. Cl.
*H04W 4/00* (2009.01)
(52) U.S. Cl.
USPC .......................................... 370/329; 455/450
(58) Field of Classification Search
USPC ........................ 370/329; 455/67.7, 452.2, 88
See application file for complete search history.

(56) References Cited

U.S. PATENT DOCUMENTS

| | | | |
|---|---|---|---|
| 2011/0136497 A1* | 6/2011 | Youtz et al. ................ | 455/452.2 |
| 2011/0256834 A1* | 10/2011 | Dayal et al. .................. | 455/67.7 |
| 2011/0312288 A1* | 12/2011 | Fu et al. ......................... | 455/88 |

FOREIGN PATENT DOCUMENTS

| | | |
|---|---|---|
| WO | WO 2011/123531 A1 | 10/2011 |
| WO | WO 2011/123550 A1 | 10/2011 |
| WO | WO 2012/044329 A1 | 4/2012 |
| WO | WO 2012/057590 A2 | 5/2012 |

OTHER PUBLICATIONS

Ericsson, 3rd Generation Partnership Project (3GPP), "Way foward for IDC Interference avoidance," 3GPP TSG-RAN WG2 #73bis, Tdoc R2-113033, Barcelona, Spain, May 3, 2011 (3 pages).
3rd Generation Partnership Project (3GPP), "Evolved Universal Terrestrial Radio Access (E-UTRA): Study on signaling and procedure for interference avoidance for in-device coexistence," 3GPP TR 36.816 V11.2.0 Dec. 22, 2011. (1 page).
Search Report under Section 17 dated Sep. 25, 2012, 2012 which is issued in a related British Application No. GB1208544.5.0 (5 pages).

* cited by examiner

*Primary Examiner* — Dang Ton
*Assistant Examiner* — Lionel Preval
(74) *Attorney, Agent, or Firm* — Lucas & Mercanti LLP; Robert P. Michal

(57) ABSTRACT

Mechanisms for controlling communications conducted in multiple frequency bands so as to decrease an interference level between the communications. When an interference situation caused between an UL communication performed on at least one frequency band and a DL communication performed on another frequency band is determined, a partial denial processing is conducted so as to deactivate a dedicated part of resource blocks used for the first communication on the at least one frequency band of the first communication in the case of an interference situation being determined. The first communication is then continued in parallel to the second communication, on the basis of resources different from the dedicated part of resource blocks deactivated in the partial denial processing.

21 Claims, 24 Drawing Sheets

INTERFERENCE CONTROL

CROSS REFERENCE TO RELATED APPLICATION

This application claims the benefit of foreign priority under 35 U.S.C. §119(a) and 37 CFR §1.55 to UK Patent Application No. 1205166.0, filed on Mar. 23, 2012, the entire content of which is incorporated herein by reference.

TECHNICAL FIELD

The present disclosure relates to mechanisms for controlling communications conducted in multiple frequency bands so as to decrease an interference level between these communications. In particular, but not exclusively, the present disclosure is directed to apparatuses, methods, computer software and computer program products providing interference control mechanisms by means of which communications conducted for example in an in-device co-existence scenario suffer less interference from each other, in particular when using carrier aggregation.

BACKGROUND INFORMATION

Prior art which is related to this technical field can e.g. be found in technical specifications according to 3GPP TR 36.816 (e.g. version 112.0) and TS36.321 (e.g. version 10.4.0).

The following meanings for the abbreviations used in this specification apply:
ALTBOC: alternate binary offset carrier
BB: baseband
BS: base station
BT: Bluetooth
BW: bandwidth
Bx: band x
CA: carrier aggregation
CC: component carrier
CPU: central processing unit
CSI: channel state information
DL: downlink
DRX: discontinuous reception
eNB: evolved node B
GNSS: global navigation satellite system
GPS: global positioning system
H3: $3^{rd}$ order harmonic distortion
IDC: in-device co-existence
IF: intermediate frequency
IMD: intermodulation distortion
ISM: industrial, scientific, medical
LO: local oscillator
LTE: Long Term Evolution
LTE-A: LTE Advanced
MAC: medium access control
PDU: protocol data unit
PSD: power spectral density
PUCCH: physical uplink control channel.
PUSCH: physical uplink shared channel
RAT: radio access technology
RB: resource Hock
RF: radio frequency
RFIC: radio frequency integrated circuit
RX: receiver
SRS: sounding reference signal
SW: software
TB: transport block
TDD: time division multiplex
TTI: transmission time interval
TX: transmission, transmitter
UE: user equipment
UL: uplink
WiFi: wireless fidelity
WLAN: wireless local access network In recent years, an increasing extension of communication networks, e.g. of wire based communication networks, such as Integrated Services Digital Network (ISDN), DSL, or wireless communication networks, such as the cdma2000 (code division multiple access) system, cellular 3rd generation (3G) communication networks such as Universal Mobile Telecommunications System (UMTS), enhanced communication networks based e.g. on LTE, cellular 2nd generation (2G) communication networks such as Global System for Mobile communications (GSM), General Packet Radio System (GPRS), Enhanced Data Rates for Global Evolutions (EDGE), or other wireless communication systems, such as Wireless Local Area Network (WLAN), Bluetooth or Worldwide Interoperability for Microwave Access (WiMAX), has taken place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between communication elements such as a UE and another communication element or UE, a database, a server, etc., one or more intermediate network elements such as communication network control elements, support nodes or service nodes are involved which may belong to different communication networks.

In order to allow users to access various networks and services ubiquitously, an increasing number of UEs are equipped with multiple radio transceivers. For example, a UE may be equipped with LTE, WiFi, and Bluetooth transceivers, as well as GNSS/GPS receivers, and the like.

However, such a configuration may result in more complicated interference situations due to coexistence interference between such collocated (radio) transceivers. For example, due to extreme proximity of multiple radio transceivers within the same UE, the transmit power of one transmitter may be much higher than the received power level of another receiver.

Conventionally, attempts have been made to avoid significant interference resulting from a transmit signal by using filter technologies and sufficient frequency separation. However, for some coexistence scenarios, e.g. different radio technologies within the same UE operating on adjacent frequencies, current state-of-the-art filter technology may not provide sufficient rejection. Therefore, solving the interference problem by single generic RF design may not always be possible so that alternative methods have to be considered.

SUMMARY

Examples of embodiments of the present disclosure provide an apparatus, method, computer software and computer program product by means of which communications conducted in multiple different frequency bands can be controlled so as to decrease an interference level between the communications. In particular, embodiments of the present disclosure provide apparatuses, methods, computer software and computer program products providing interference control mechanisms by means of which communications conducted for example in an in-device co-existence scenario suffer less interference from each other, for example when using carrier aggregation in a cellular communication part, or when using a single-carrier communication causing interference on neighboring channels of another communication type.

This is achieved by the measures defined in the attached claims.

In accordance with first embodiments, there is apparatus for use in providing interference control in a communication element, the apparatus comprising:

an interference determination portion arranged to determine an interference situation caused between a first communication performed on at least one frequency band and a second communication performed on another frequency band different from the at least one frequency band of the first communication;

a partial denial processing portion arranged to conduct a partial denial procedure for deactivating a dedicated part of resource blocks used for the first communication on the at least one frequency band of the first communication in the case of an interference situation being determined; and a communication continuation processing portion arranged to continue, in parallel to the second communication, the first communication with resources different from the dedicated part of resource blocks deactivated by the partial denial processing portion.

In accordance with second embodiments, there is a method for use in providing interference control in a communication element, the method comprising:

determining an interference situation caused between a first communication performed on at least one frequency band and a second communication performed on another frequency band different from the at least one frequency band of the first communication;

conducting a partial denial procedure for deactivating a dedicated part of resource blocks used for the first communication on the at least one frequency band of the first communication in the case of an interference situation being determined; and continuing, in parallel to the second communication, the first communication with resources different from the dedicated part of resource blocks deactivated in the partial denial procedure.

In accordance with third embodiments, there is apparatus for use in providing interference control in a communication network control element, the apparatus comprising:

an interference situation report processing portion arranged to receive and process an interference report indicating an interference situation caused between a first communication performed on at least one frequency band and a second communication performed on another frequency band different from the at least one frequency band of the first communication, wherein the interference report comprises at least one of frequency information identifying resources to be deactivated of carriers of the at least one frequency band of the first communication, and/or information related to resource blocks to be deactivated on the first communication;

a partial denial portion arranged to control disabling of a dedicated part of resource blocks used for the first communication, the dedicated part of resource blocks being determined on the basis of the interference report; and a communication continuation control portion arranged to control continuation of the first communication with resources different from the dedicated part of resource blocks to be disabled.

In accordance with fourth embodiments, there is a method for use in providing interference control in a communication network control element, the method comprising:

receiving and processing an interference report indicating an interference situation caused between a first communication performed on at least one frequency band and a second communication performed on another frequency band different from the at least one frequency band of the first communication, wherein the interference report comprises at least one of frequency information identifying resources to be deactivated of carriers of the at least one frequency band of the first communication, and/or information related to resource blocks to be deactivated on the first communication;

controlling disabling of a dedicated part of resource blocks used for the first communication, the dedicated part of resource blocks being determined on the basis of the interference report; and controlling a continuation of the first communication with resources different from the dedicated part of resource blocks to be disabled.

In accordance with fifth embodiments, there is computer software adapted to perform the method of the second embodiments.

In accordance with sixth embodiments, there is computer software adapted to perform the method of the fourth embodiments.

In accordance with seventh embodiments, there is a computer program product comprising a non-transitory computer-readable storage medium having computer readable instructions stored thereon, the computer readable instructions being executable by a computerized device to cause the computerized device to perform a method according to the second embodiments.

In accordance with eighth embodiments, there is a computer program product comprising a non-transitory computer-readable storage medium having computer readable instructions stored thereon, the computer readable instructions being executable by a computerized device to cause the computerized device to perform a method according to the fourth embodiments.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an apparatus, method, computer software and computer program product by means of which communications conducted in multiple different frequency bands (for example in an IDC application where one or more communications or radio transmissions in UL direction may cause interference on some DL communication(s) conducted via plural frequency bands used for a respective communication (for instance, LTE B7/B40 band and ISM band co-existence)), can be controlled in such a manner that interference on victim communications, for example the DL communication on the ISM band having a weaker power level, is avoided or mitigated. In particular, in a case of carrier aggregation (CA) where two UL communications are used and may cause intermodulation interference on a DL communication, or in a case where the frequency spectra of UL and DL communications are very close or partly overlapping, desense on the DL communication can be mitigated or avoided, in addition, it is possible to obtain a consistent throughput in the (weaker) second communication, for example for communications via the ISM band or other (non-3GPP) RAT, while a data throughput in the first communication (e.g. LTE-A in CA mode) can be kept at a same or at least sufficient level. Furthermore, embodiments can be implemented in existing network configurations, for example by means of a software or firmware update.

The above and still further objects, features and advantages of embodiments will become more apparent upon referring to the description and the accompanying drawings.

DETAILED DESCRIPTION

Figure 1:
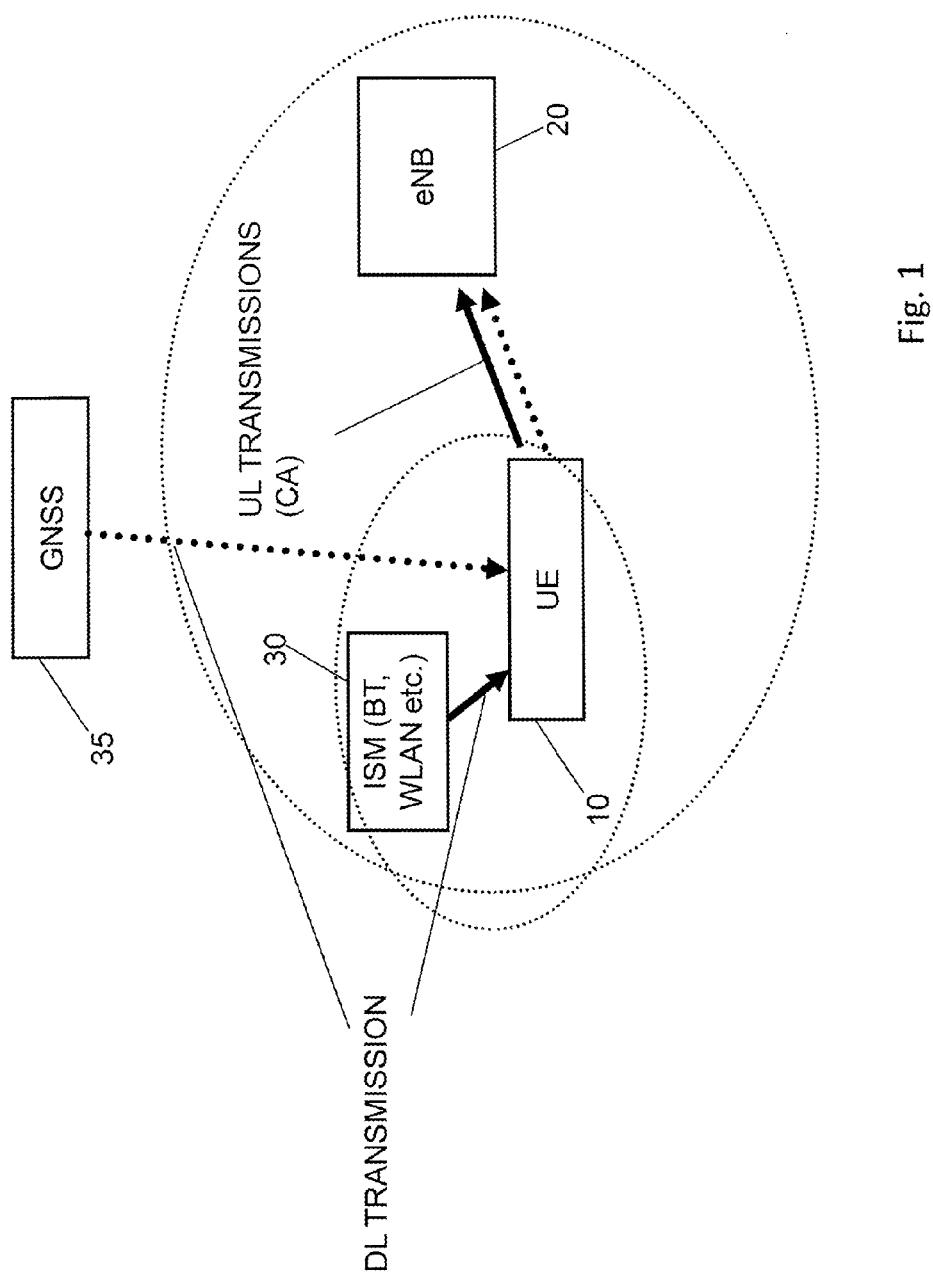
FIG. 1 shows a diagram illustrating a communication network structure in which embodiments are applicable.

In the following, examples and embodiments of the present disclosure are described with reference to the drawings. For illustrating the present disclosure, the examples and embodiments will be described in connection with a cellular communication network based on a 3GPP LTE or LTE-A system wherein at least one further communication access is provided with which a UE can conduct a communication, such as an ISM network or a GSNN system. However, it is to be noted that the present disclosure is not limited to an application using such types of communication systems, but is also applicable in other types of communication systems and the like as long as interferences between communications may occur.

A basic system architecture of a communication network where embodiments are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station (BS) or an eNB, which control a coverage area also referred to as a cell and with which a communication element or device such as a UE or another device having a similar function, such as a modem chipset, chip, module etc., which can also be part of a UE or attached as a separate element to a UE, or the like, is capable of communicating via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element like a UE or a communication network control element like an eNB or a server etc., besides those described in detail herein below.

Furthermore, the described network elements, such as communication elements such as UEs, communication network control elements such as BSs, eNBs, servers and the like, as well as corresponding functions as described herein may be implemented by software, e.g. by a computer program product for a computer, and/or by hardware. In any case, for executing their respective functions and/or algorithms, correspondingly used devices, nodes or network elements may comprise several means and components (not shown) which are required for control, processing and communication/signaling functionality. Such means may comprise, for example, a processing system, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification, processing portions should not be only considered to represent physical portions of one or more processors, but may also be considered as a logical division of the referred processing tasks performed by one or more processors.

With regard to FIG. 1, a diagram illustrating a general configuration of a communication network is shown where embodiments are applicable. It is to be noted that the structure indicated in FIG. 1 shows only those devices, network elements and parts which are useful for understanding principles underlying embodiments. As also known by those skilled in the art there may be several other network elements or devices involved in a connection between the communication element (UE) and the respective networks which are omitted here for the sake of simplicity.

In FIG. 1, reference sign 10 denotes a communication element such as a UE or the like which is capable of communicating with different kinds of communication networks or devices, for example via carriers belonging to different frequency bands.

Reference sign 20 denotes a communication network control element such as a BS or eNB controlling a communication area or cell (indicated by a dashed line). It is to be noted that there may be several cells in the communication network which are controlled, for example, by the communication network control element 20 or by another (not shown) communication network control element, such as another BS or eNB, which other cells belong together with the shown cell of the eNB 20 to an overlaying communication area. The UE 10 may communicate with the eNB 20 via one or more communications (carriers or CC, illustrated in FIG. 1 by a solid and a dashed arrow in UL direction).

In addition, different communication accesses, networks or systems are present with which the UE 10 can communicate in parallel to the communications conducted with the eNB 20 (indicated by a solid arrow for DL communication). For example, a communication system 30 using an ISM band, such as a BT or WLAN/WiFi system is provided, e.g. in the form of a corresponding server and transceiver. Another example for an alternative communication system is a GNSS (or other positioning) system 35 having plural transmitters e.g. in satellites which send signals for conducting a positioning operation (indicated by a dashed arrow).

As indicated above, in order to allow the UE 10 to ubiquitously access the various networks or communication systems and services as indicated in FIG. 1, the UE 10 may be equipped with multiple radio transceivers. For example, in the configuration example as shown in FIG. 1, it is assumed that the UE 10 has a configuration as depicted, for example, in FIG. 2.

Figure 2:
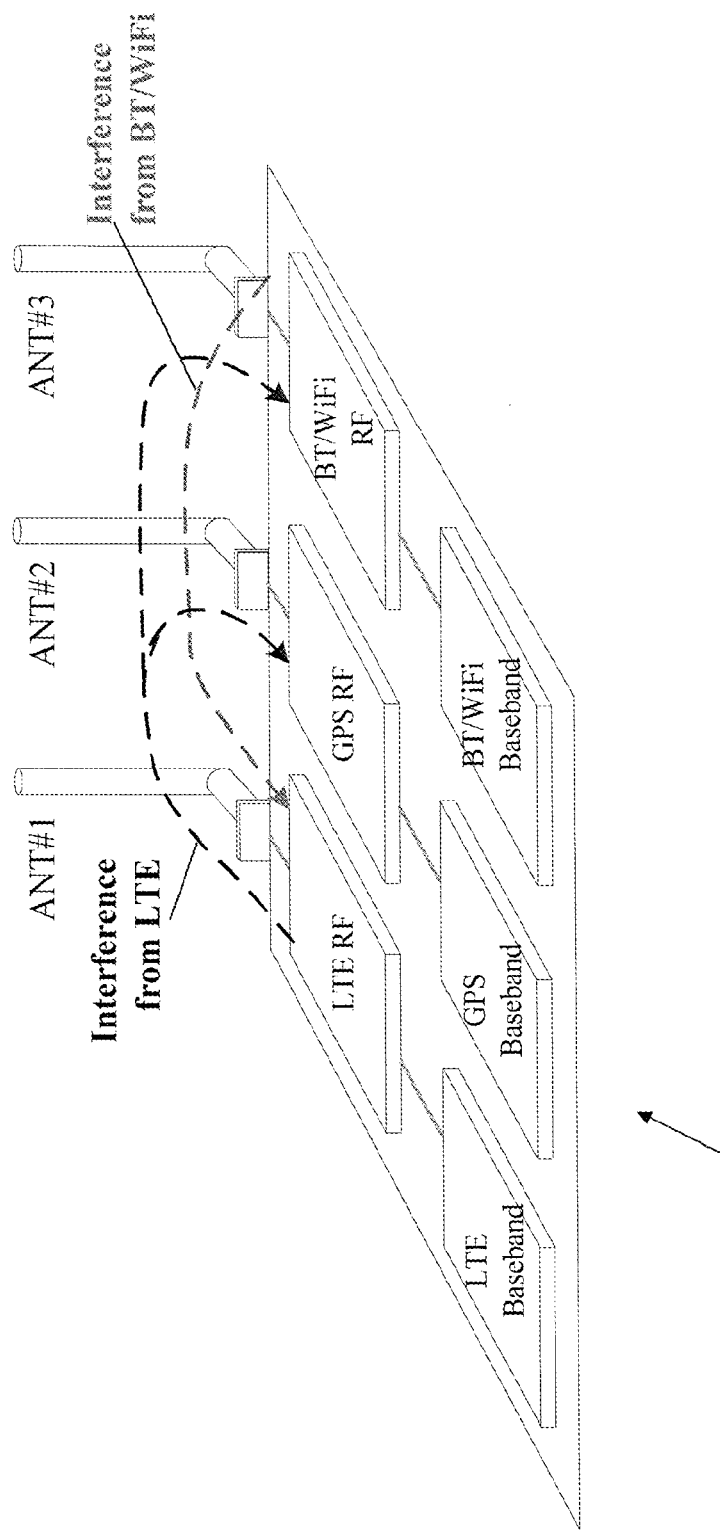
FIG. 2 shows a block circuit diagram illustrating a configuration of a communication element where interference caused by different communications is illustrated.

As indicated in FIG. 2, the UE 10 is equipped with plural transceiver/antenna configurations, for example a transceiver/antenna configuration connected to ANT#1 used for communications with the eNB 20 (referred to as LTE based communications, which however also applies generally for LTE-A based communications), a receiver/antenna configuration connected to ANT#2 used for communications with the GNSS or GPS system 35 (referred to as GPS based communications), and a transceiver/antenna configuration connected to ANT#3 used for communications with the ISM based server 30 (referred to as WLAN/BT based communication).

in FIG. 2, examples for coexistence interference which may be generated between those collocated radio transceivers are indicated by dashed arrows. That is, due to the proximity of the multiple radio transceivers within UE 10, as indicated in FIG. 2, a situation may arise in which the transmit power of one transmitter may be much higher than the received power level of another transceiver/receiver. Hence, interference from the LTE (or LTE-A) based communications to the GPS based communication and/or the WLAN/BT based communication may arise, while on the other hand also interference from the WLAN/BT communication to the LTE (or LTE-A) based communication may occur.

It has been discovered that one critical situation can arise when for a communication with the eNB, i.e. an LTE (or LTE-A) based communication, a carrier aggregation mode is used where CCs of different frequency bands are used for communication. One CA mode is the inter-band CA where e.g. two or more UL connections using different and separated carriers on different frequency bands are used. This is the case in FIG. 1 where both arrows from UE 10 to eNB 20 are valid.

However, active UL communications produce intermodulation products at certain frequencies. With some band combinations, the intermodulation product may appear on top of some other 3GPP and/or non 3GPP band, such as the ISM band. In addition, in certain inter-band CA cases, either of the UL communications may produce third order harmonic distortion (H3) which overlaps with another network's or DL communications (indicated in FIG. 1 by respective arrows from the ISM server 30 or the GSNN system 35 to the UE 10).

Figure 3:
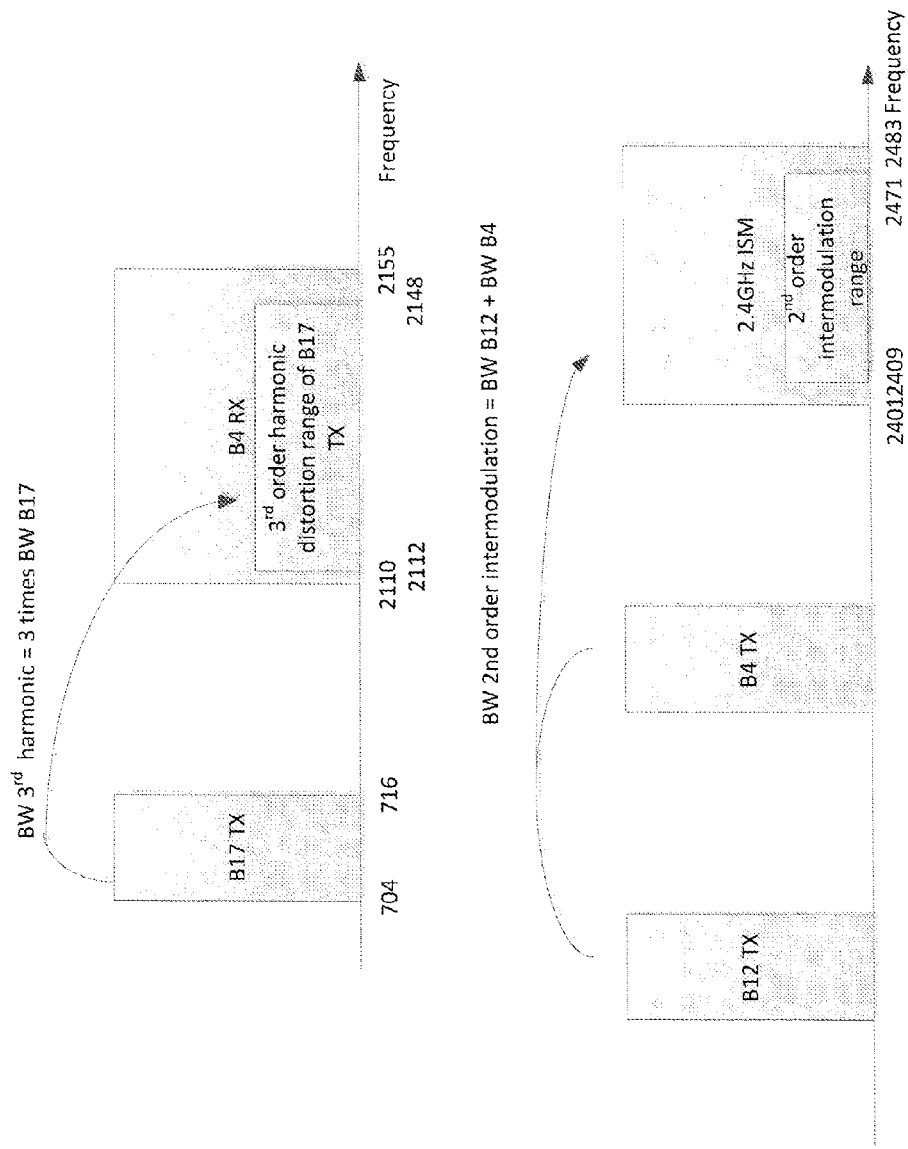
FIG. 3 shows a diagram illustrating examples of interferences caused by communications via different frequency bands.

FIG. 3 shows a diagram illustrating examples of interferences caused by communications via different frequency bands in a communication network configuration as indicated, for example, in FIG. 1. Specifically, FIG. 3 illustrates the behavior of H3 and $2^{nd}$ order intermodulation.

In the upper diagram of FIG. 3, the two frequency bands B17 (from e.g. 704 to 716 MHz) and B4 (from e.g. 2110 to 2155 MHz) are indicated wherein it is assumed that the B17 band is used for transmission (TX) and the B4 band is used for reception (RX). As indicated, a 3rd order harmonic distortion range of the B17 TX band is caused in the B4 band having a bandwidth 3 times that of the B17 band.

In the lower diagram of FIG. 3, two frequency bands B12 and B4 are assumed to be used for transmission (TX). Furthermore, another frequency band such as an ISM band (here in the 2.4 GHz range, from 2401 MHz to 2483 MHz) is assumed to be used for communication. It is to be noted that several definitions or regulations exist regarding the frequency ranges of ISM bands which may be used instead of the range indicated here. For example, ITU defines ISM bands from 2.4 to 2.5 GHz, wherein BT operates from 2.4 to 2.484 GHz and WLAN operates in a similar frequency range. A 2nd order intermodulation range of a 2nd order intermodulation of bandwidths B12 and B4 is caused in the ISM band having a bandwidth from 2409 to 2471 MHz.

Figure 4:
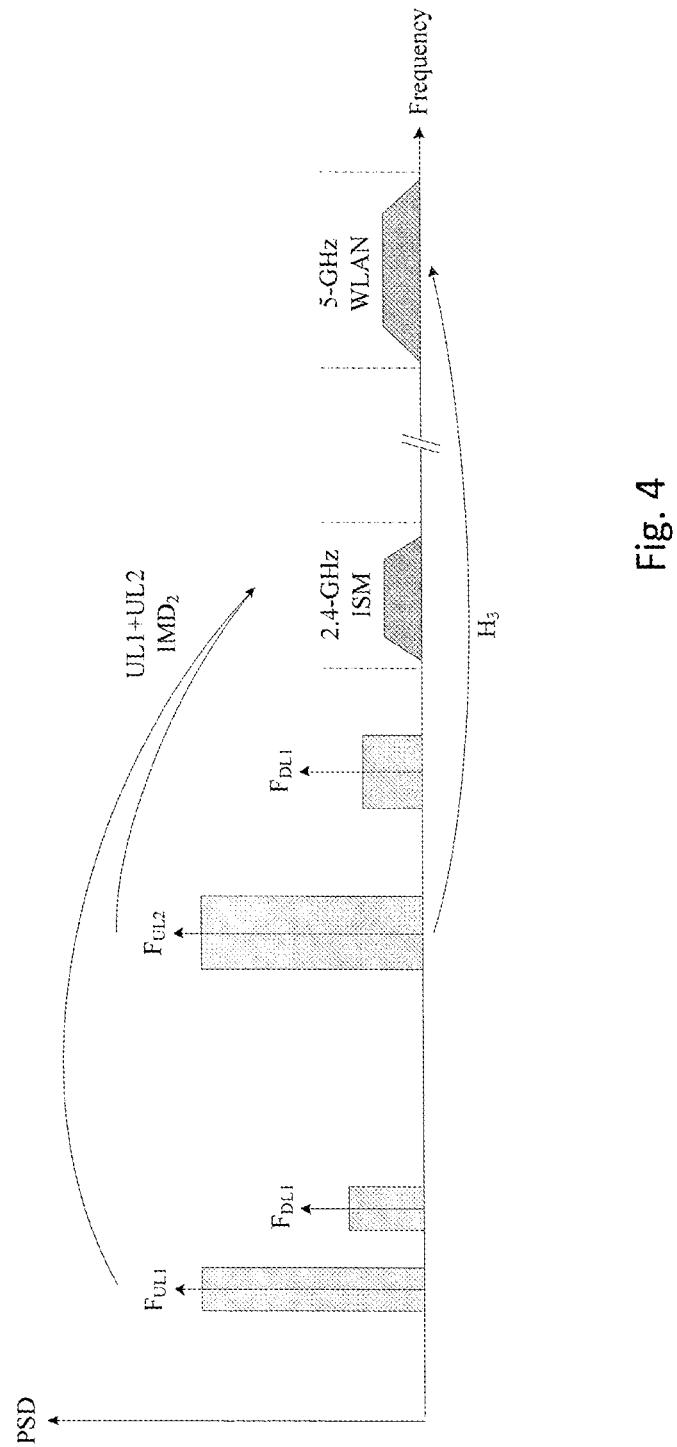
FIG. 4 shows a diagram illustrating examples of interferences caused by communications via different frequency bands.

FIG. 4 shows a further diagram illustrating examples of interferences caused by communications via different frequency bands in a communication network configuration as indicated, for example, in FIG. 1. In detail, FIG. 4 illustrates examples of 3GPP carrier aggregation (CA) scenarios causing H3 and $2^{nd}$ order intermodulation interferences in non-3GPP bands (here, ISM-band of 2.4 and 5 GHz, or the like). It is to be noted that there are of course other interferences, such as a second order harmonic (H2), wherein a second harmonic of B14 UL causes interference on a 1.57-GHz GPs signal, for example, or other interferences not shown for the sake of simplicity.

Specifically, different frequency bands providing frequency ranges used for UL communications, that is two UL communications UL1 and UL2 with frequencies $F_{UL1}$, $F_{UL2}$, and for DL communications, that is two DL communications DL1 and DL2 with frequencies $F_{DL1}$, $F_{DL2}$, are shown which are used e.g. for LTE based communications between the UE 10 and the eNB 20 as shown in FIG. 1, wherein the power of the UL communications is assumed to be higher than that of the DL communications (indicated by the height or PSD value of the frequency range blocks). Furthermore, ISM and WLAN bands at 2.4 GHz and 5 GHz ranges are shown. As indicated by the arrows, a 2nd order intermodulation distortion (IMD2) is caused by the two UL communications at the 2.4 GHz ISM-band, and a 3rd order harmonic distortion H3 is caused by either of the UL communications (here UL communication UL2) at the 5 GHz band. That is, when referring back to the bands indicated in FIG. 3, for example, this would lead to a result where in the case of B4+B12 band usage, the 2nd order intermodulation distortion (due to UL1+UL2) would cause desense on the 2.4-GHz ISM band and 3rd order harmonic of UL2 (B4) would hit the 5-GHz WLAN band.

In table 1, examples of CA band combinations are listed which represent aggressors causing interferences in other band(s), i.e. victim bands/frequency areas, in accordance with the general illustration of FIG. 4. In table 1, also examples of harmonic and intermodulation interference scenarios are indicated where a $3^{rd}$ order intermodulation distortion (IMD3) is effective, for example.

TABLE 1

Example of 3GPP CA scenarios causing IMD2, IMD3, or H3 to non-cellular RATs

| Aggressors | | UL1 + | UL1 − | 2UL1 − | Victims | |
|---|---|---|---|---|---|---|
| UL1 Band #1 | UL2 Band #2 | UL2 IMD2 | UL2 IMD2 | UL2 IMD3 | UL1 H3 | UL2 H3 |
| 12 | 4 | 2.4 GHz ISM | — | — | — | 5-GHz WLAN |
| 17 | 4 | 2.4 GHz ISM | — | — | — | 5-GHz WLAN |
| 20 | 12 | GPS | — | — | — | — |
| 5 | 12 | — | — | — | 2,4 GHz ISM | — |
| 5 | 4 | — | — | — | 2.4 GHz ISM | 5-GHz WLAN |
| 3 | 20 | — | — | — | 5-GHz WLAN | — |
| 3 | 5 | — | — | — | 5-GHz WLAN | 2.4 GHz ISM |
| 4 | 7 | — | — | — | 5-GHz WLAN | — |
| 2 | 17 | — | Galileo (E5A, ALTBOC) | — | — | — |
| 4 | 13 | — | — | — | 5-GHz WLAN | Compass E2 |
| 5 | 17 | — | Galileo E1, Compass E2 | — | — | — |
| 1 | 7 | 5-GHz WLAN | — | Galileo E6 | — | — |
| 1 | 18 | — | — | — | — | 2.4 GHz ISM |
| 11 | 18 | — | — | — | — | 2.4 GHz ISM |
| 1 | 21 | — | — | 24 GHz ISM | — | — |

That is, for example, respective component carriers allocated to the respective UL bands, e.g. a combination of component carriers of respective UL bands B17 and B4 causes an IMD2 interference situation in the 2.4 GHz ISM-band, while a combination of UL bands B12 and B4 may cause an IMD2 interference situation in the 2.4 GHz band and the band B4 may cause a H3 interference situation in the 5 GHz band. Other examples are as derivable from table 1.

It is to be noted that the effect of IMD2 depends on the actual frequency relation of the CCs on the UL communications and victim DL communications. Furthermore, it is to be noted that the above list is intended to be only for illustrative purposes and not to give a complete overview, i.e. that there are further combinations of UL frequency bands, CA band combinations and scenarios causing further interference situations where embodiments are also applicable.

Figure 23:
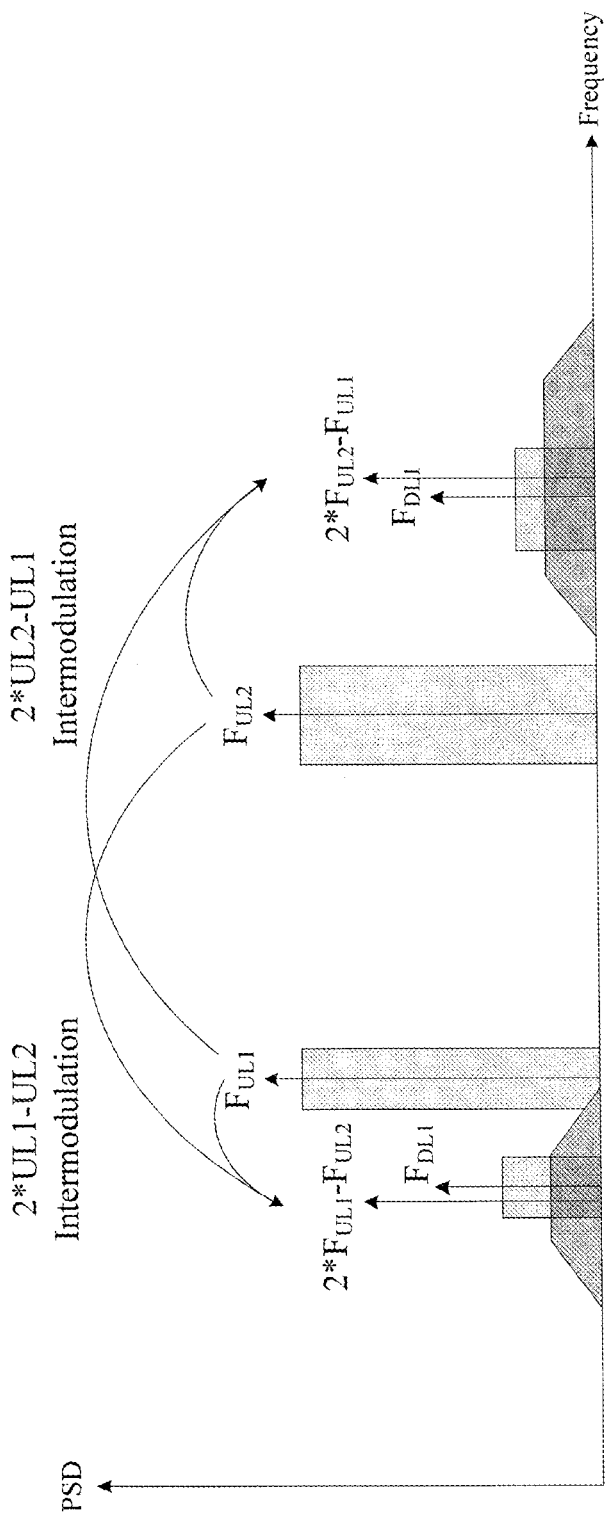
FIG. 23 shows a diagram illustrating further examples of interferences caused by communications via different frequency bands.

FIG. 23 shows a further diagram illustrating examples of interferences caused by communications via different frequency bands in a communication network configuration as indicated, for example, in FIG. 1. In detail, FIG. 23 illustrates examples of 3GPP carrier aggregation (CA) scenarios causing H3, $2^{nd}$ order intermodulation interferences (IMD2) and $3^{rd}$ order intermodulation interferences (IMD3) in DL communications on 3GPP bands (here, UL1, UL2, DL1 and DL2, or the like).

Specifically, different frequency bands providing frequency ranges used for UL communications, that is two UL communications UL1 and UL2 with frequencies $F_{UL1}$, $F_{UL2}$, and for DL communications, that is two DL communications DL1 and DL2 with frequencies $F_{DL1}$, $F_{DL2}$, are shown which are used e.g. for LTE based communications between the UE 10 and the eNB 20 as shown in FIG. 1, wherein the power of the UL communications is assumed to be higher than that of the DL communications (indicated by the height or PSD value of the frequency range blocks). As indicated by the arrows, intermodulation distortion (IMD2 or IMD3) is caused by the two UL communications at the respective DL communications.

In table 2, examples of CA band combinations are listed which represent aggressors causing interferences in other band(s), i.e. victim bands/frequency areas, in accordance with the general illustration of FIG. 23. In table 2, also examples of harmonic and intermodulation interference scenarios are indicated where a $3^{rd}$ order intermodulation distortion (IMD3) is effective, for example.

TABLE 2

Example of 3GPP CA UL scenarios causing
IMD2, IMD3 or H3 to 3GPP DL communications

| Aggressors | | Victims | | | |
|---|---|---|---|---|---|
| UL1<br>Band #1 | UL2<br>Band #2 | UL1-UL2<br>IMD2 | 2UL1-UL2<br>IMD3 | 2UL2-UL1<br>IMD3 | UL1<br>H3 |
| 17 | 4 | — | — | — | DL2 |
| 5 | 4 | DL1 | — | — | — |
| 8 | 20 | — | DL1 | DL2 | — |
| 3 | 5 | — | — | DL2 | — |

For example, in case of B4+B17 band usage for the UL communications, the $3^{rd}$ order harmonic of B17 UL can cause desense on the B4 receiver and corrupt the DL signal quality. Similarly, a $2^{nd}$ order intermodulation in case of using B5+B4 in UL can desense B5 DL. Furthermore, aggregating B20 and B8 can cause $3^{rd}$ order intermodulation products from B20 UL (832-862 MHz) and B8 UL (880-915 MHz) overlapping with both B8 DL (925-960 MHz) and B20 DL.

According to embodiments, mechanisms for controlling the communications conducted in a network configuration according to e.g. FIG. 1 with a UE having multiple transceivers as shown e.g. in FIG. 2 are provided, by means of which interferences caused in an IDC case (e.g. 3GPP RAT+non-3GPP RAT) are mitigated or avoided, in particular in case the UE operates in a CA mode, such as an inter-band CA mode, with two or more UL communications as indicated in FIGS. 1 and 4, but also in a case where one UL communication is used which causes interference on a non-3GPP RAT communication, for example due to overlapping or very close frequency spectra used for the respective communication, or in a case where one UL communication is used which causes interference on a non-3GPP RAT or 3GPP RAT (LTE or LTE-A) communication by an $n^{th}$ (e.g. $2^{nd}$, $3^{rd}$) harmonic, or in a case where two or more UL communications operating in CA mode causes an interference by an $n^{th}$ (e.g. $2^{nd}$ or $3^{rd}$) harmonic of either one of the at least two UL.

That is, according to embodiments, in order to decrease the interferences caused by a first communication, such as UL1 communication and/or UL2 communication on other communications such as those via the ISM band or WLAN band, as indicated in FIG. 4, or on DL communication of also a 3GPP based communication, as indicated in FIG. 23, a part of resources such as resource blocks or frequency portions of the used frequency spectrum of the first communication (i.e. of the only one communication or of either one of the at least two communications conducted with the eNB), i.e. a dedicated part of RBs or the like used for the first communication which comprise those RBs being identified as causing the above described IDC interference through intermodulation (IMD2), is deactivated for at least a predetermined time or the like.

Figure 5:
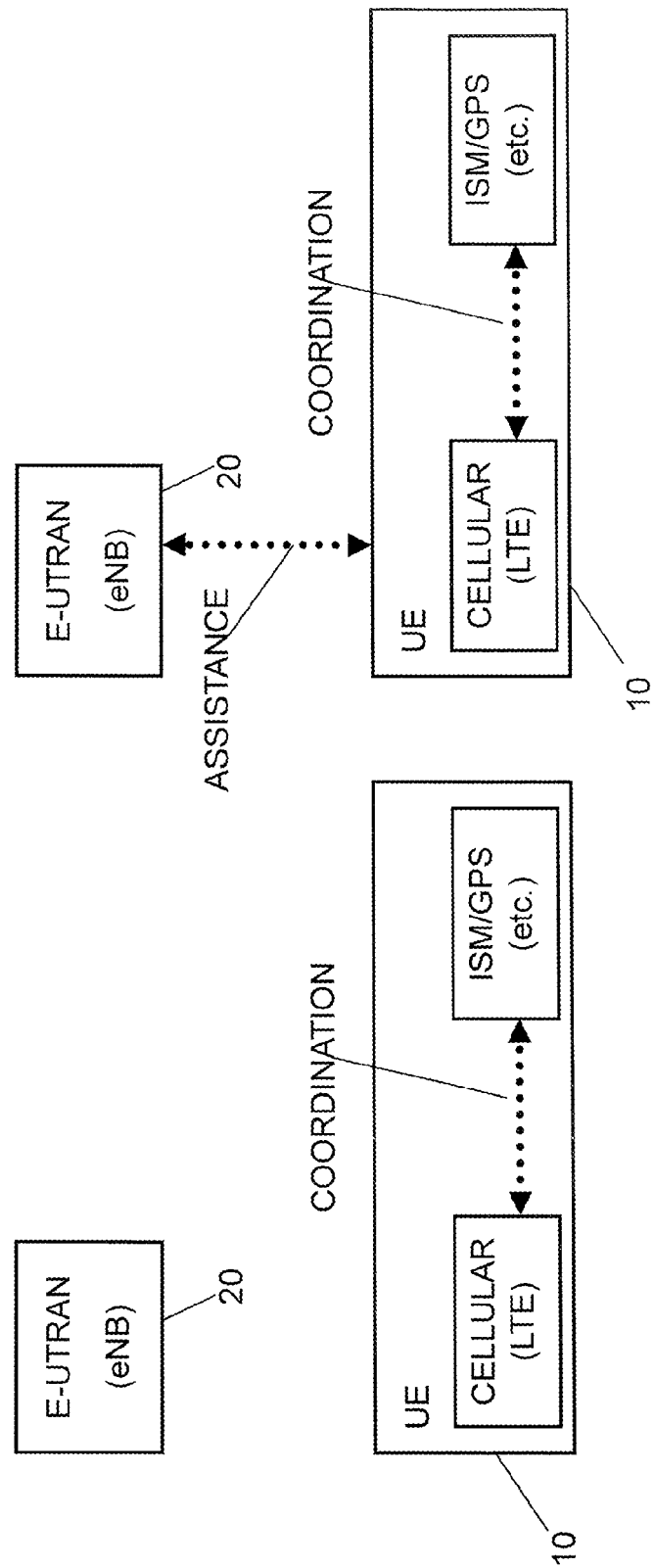
FIGS. 5a and 5b show block circuit diagrams illustrating different schemes for coordinating coexistence issues between different types of communications according to embodiments.

According to embodiments, as shown in FIGS. 5a and 5b, there are two schemes for coordinating coexistence issues between communications on the different communication systems, such as on a cellular (LIE based) communication part and an ISM based or UPS based communication part etc., as indicated in FIG. 2.

In a first mode, the coordination is done only in the UE 10. That is, as depicted in FIG. 5a, there is an internal coordination between the different radio technologies within the same UE, which means that at least the activities of one radio connection is known by the other radio connection(s). In this mode, the network (i.e. the eNB 20) is not involved in the coordination processing and thus not aware of the coexistence issue possibly experienced by the UE.

On the other hand, in a second mode, the coordination between the different radio technologies within the same UE is coordinated within the UE and the network. That is, as depicted in FIG. 5b, for example, the different radio technologies within the UE are aware of possible coexistence problems and the UE is able to inform the network (i.e. the eNB 20, for example) about such problems. The network may then assist or mainly control the coordination, i.e. control the measures to mitigate or avoid coexistence interference.

In the following, embodiments are described where the coordination scheme according to FIG. 5a is assumed, i.e. where the interference control is conducted by the communication element or UE 10, for example. However, it is to be noted that the principles described below are also applicable in case a coordination scheme according to FIG. 5b (to be described later) is applied.

According to these embodiments, the UE 10 conducts a partial autonomous denial process. That is, a part (but not all) of an UL component carrier (CC) (first communication) causing the interference with the non-3GPP based communication (WLAN or the like) (second communication) is disabled or deactivated, i.e. not used anymore for the first communication. This is, based on the fact that there are cases where a great part of the resources used for the first communication, such as resource blocks (RB) on the CC can be transmitted without or only weakly desensitizing the second communication (the non-3GPP RAT DL communication, for example). In other words, only a part of the resource blocks (i.e. a part of the first communication) is responsible for (most of) the interference caused at the second communication. Hence, according to the present embodiment, since the UE 10 has the knowledge of the other RATs concurrently operating within the device, the UE 10 can coordinate the activities between RATs by itself (other examples related to a case where the coordination is done within the network will be discussed below).

For example, according to an embodiment, a partial autonomous denial operation is executed in the UE 10 for either one of the two UL communications in case of a CA mode, or for a single UL communication in case of a neighboring or overlapping spectrum situation. That is, according to an embodiment, partial autonomous denial in an IDC case with inter-band CA and a non-3GPP RAT (like WLAN) is used, wherein the UE 10 is configured to use the autonomous denial on the LTE-A UL communication(s) in case it is determined that there is an unacceptable desense to another RAT, such as a WLAN communication (as indicated in FIG. 4). In the partial autonomous denial procedure according to embodiments, the UE 10 conducts a determination of RBs causing a predetermined amount of interference on top of the other RAT communication (also referred to as a dedicated part of RBs to be deactivated) and performs a deactivation processing in which the dedicated part of RBs is disabled in the LTE-A UL communications (i.e. in at least one frequency band used for the LTE-A UL communication) is not used anymore for transmission during times when data is received via the other radio communication (WLAN or the like).

According to a further embodiment, triggers are provided that are used in order to maximize an UL throughput or to prioritize one of the UL communications etc, i.e. a selection process is executed in order to select that of the UL communications (carriers) for deactivation which causes a minimal impact on the communication performance in the LIE or LTE-A communication, for example.

A procedure for conducting the partial autonomous denial on the UE side according to embodiments comprises the following processing.

First, it is determined whether an interference situation like that illustrated in connection with FIG. 4 or FIG. 23 is assumed to happen. For example, this determination may be based on a comparison between transmitting times and reception times via the different communication connections (LTE or LTE-A based connections, WLAN connection, etc.). In LTE and LTE-A, for example, the transmission and reception time is known some time in advance (e.g. ~4 ms or the like). Also, reception timing for a non-3GPP communication like WLAN is known some time in advance. For example, in WLAN power save mode, only the beacons need to be received at a certain time, all other data can be buffered in a hotspot and transmitted to the UE when possible. Thus, based for example on UL allocation grants received from the eNB 20 in configuration signaling, it can be determined that transmissions via the UL connection to the eNB 20 (in inter-band CA mode, for example) would happen concurrently with a scheduled reception of the non-3GPP communication which would lead e.g. to the IMD2 as shown in FIG. 4. In other words, the ISM DL connection is determined to be desensitized at the times of concurrent communications on these UL and DL communication paths.

It is to be noted that the determination of whether or not an interference situation is possibly present may also be based on other mechanisms. For example, a probability of a reception via the DL connection may be estimated and used as a basis for a determination of a concurrent communication. Alternatively, some priority level may be assigned to the non-3GPP communication (e.g. in case of high data transfer rates via a WLAN connection indicating that the user is currently interested in a proper reception) which may lead to the decision that the non-3GPP connection may not be interfered at any time.

After having determined that an interference situation is possible, the UE 10 conducts a partial denial process so as to determine the dedicated part of RBs to be deactivated and to disable a transmission by using these RBs according to the dedicated part of RBs. It is to be noted that RBs not determined to be deactivated (i.e. RBs being different from those in the dedicated part of RBs) are assumed to be still usable for the communication so that the first communication can be conducted by using these different RBs in parallel to the reception on the other (second) communication.

According to embodiments, the determination of RBs for the dedicated part of RBs to be deactivated and/or a selection of a CC (in case more than one CC is used for the UL communication) in which RBs used for the UL communication may be deactivated (for at least some time) may consider one or more of the following: a determination that there is no control channel such as PUCCH included, a comparison which of the UL communications has less RBs allocated, and/or an estimation of which of the UL communications causes more interference, for example (in addition to the IMD2 interference) a H3 distortion (see e.g. table 1).

It is to be noted that an interference level caused by the UL communications, such as the intermodulation distortion level, is actually low enough that the DL communication, such as that via the ISM band, is not desensitized in a critical manner. In other words, for example, even though the frequency relationship as indicated in FIGS. 3 and 4 is valid, a transmission power on the UL communications (i.e. LTE-A TX power level) is low enough so that the interference is not critical. Thus, according to embodiments, it is determined whether the interference caused in the interference situation determined as described above is higher than a predetermined threshold or the like. If it is determined that the interference level is not critical (e.g. below the threshold) it is decided that there is no need to deny transmissions, and the partial deactivation of RBs is stopped or not continued (for example, the determination of the interference level is conducted continuously or periodically when the partial deactivation is conducted so as to be able to react to changing communication properties like decreasing TX power level required for the UL communications).

According to embodiments, the transmission mode control (i.e. decision to conduct partial denial procedure or not) at the communication element (device/terminal) may comprise a hysteresis management functionality being configured to avoid excessive hysteresis between the transmission modes (with or without partial deactivation). In such hysteresis management, the communication element may base its decision for the applicability of a mode switching e.g. on network conditions, any available output power restriction value or values, battery capacity, whether there is a connection to power supply, which applications/services are active, movement of the device, CA band combination, TX resources, RX resources, or the like.

For example, according to embodiments, a trigger for determining that it is not necessary to conduct the partial denial procedure of the UL communication even if a (potential) interference situation is determined is based on a comparison of a preset threshold power level and the LTE-A TX output power value(s) on the UL communications. In case the threshold power level is not exceeded by the TX power value(s), then it is decided that the partial denial is not necessary (anymore) and the partial autonomous denial procedure is stopped, even if for example UL allocation grants indicate concurrent transmissions with ISM reception, or the like. On the other hand, in case the preset threshold is exceeded, then the partial autonomous denial for the dedicated part of RBs in the selected UL communication (CC) is executed.

It is to be noted that the deactivation of the dedicated part of RBs (partial denial) of the UL communication is done, according to examples, for a predetermined time, for example, on a per subframe basis (subframe duration in LTE or LTE-A is 1 ms, for example). That is, a decision regarding interference situation and partial denial (RB deactivation) is carried out for each subframe. However, it is to be noted that also another time unit for the duration of a partial deactivation of RBs for an UL communication may be set.

Furthermore, it is to be noted that embodiments may be implemented in a communication element such as a UE, a UE memory/application engine/processor or equivalent.

Figure 6:
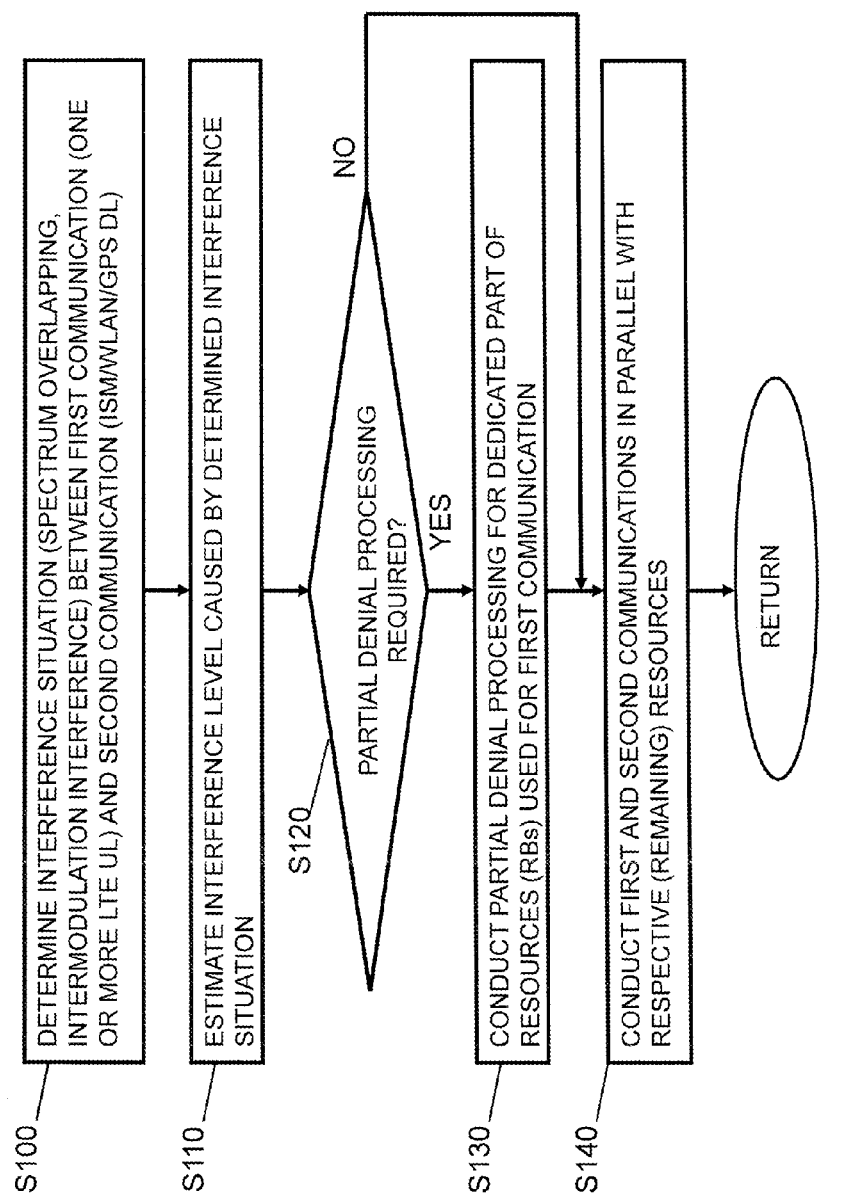
FIG. 6 shows a flow chart illustrating a procedure conducted by a communication element according to an embodiment.

FIG. 6 shows a flow chart illustrating a procedure conducted by a communication element, such as an UE 10 as shown in FIG. 1, according to an embodiment, wherein a coordination scheme according to FIG. 5*a* is assumed to be applied.

In step S100, it is determined that an interference situation (e.g. IMD2 appearing at least partially of top of for instance used ISM channel, interference caused by overlapping frequency spectrum) caused between a first communication performed on at least one frequency band (e.g. one UL communication or the UL1 and UL2 communications) and a second communication performed on another frequency band different from the at least one frequency band of the first communication (e.g. the DL communication on WLAN band) is present. The interference situation is determined, for example, on the basis of a comparison between scheduled or estimated timings for transmissions in the first communication (e.g. the UL allocation grants) and scheduled or estimated timings for a transmission in the second communication (e.g. expected or known reception time in DL WLAN communication).

Then, in step S110, an interference level estimation is conducted so as to determine whether the determined interference situation is critical or not. That is, for example, a level of interference caused by the determined interference situation (IMD2 or the like) is compared with a predetermined threshold, for example on the basis of a comparison of TX power levels and a preset threshold, wherein on the basis of the comparison in step S120 a decision is made as to whether a partial denial processing is to be conducted (e.g. in case the estimated level of interference is equal to or higher than the predetermined threshold; YES branch in FIG. 6), or the partial denial procedure is not conducted or stopped (e.g. in case the estimated level of interference is lower than the predetermined threshold; NO branch in FIG. 6).

It is to be noted that steps S110 and S120 may also be omitted in embodiments, i.e. the deactivation is executed as soon as an interference situation is determined (step S130 follows to step S100).

In step S130, a partial denial procedure is conducted so as to determine a dedicated part of RBs of the first (UL) communication causing a specific amount of interference on the second (DL) communication and to deactivate these RBs for the first communication, in case the interference situation is determined. According to present embodiments, the partial denial procedure for determining the RBs to be disabled is an partial autonomous denial operation comprising a selection process for selecting corresponding RBs and possibly a CC (in case more than one CC is used) based e.g. on the above described criteria, and a process for inhibiting a transmission on the RBs determined as the dedicated part of RBs to be deactivated on the (selected) CC for a predetermined time based on the determined interference situation.

In step S140, the first communication is continued in parallel with the second communication wherein on the basis of the processing in step S130 only those resources (RBs different from those indicated in the dedicated part of RBs to be deactivated) are used for communicating in the first UL communication.

Figure 7:
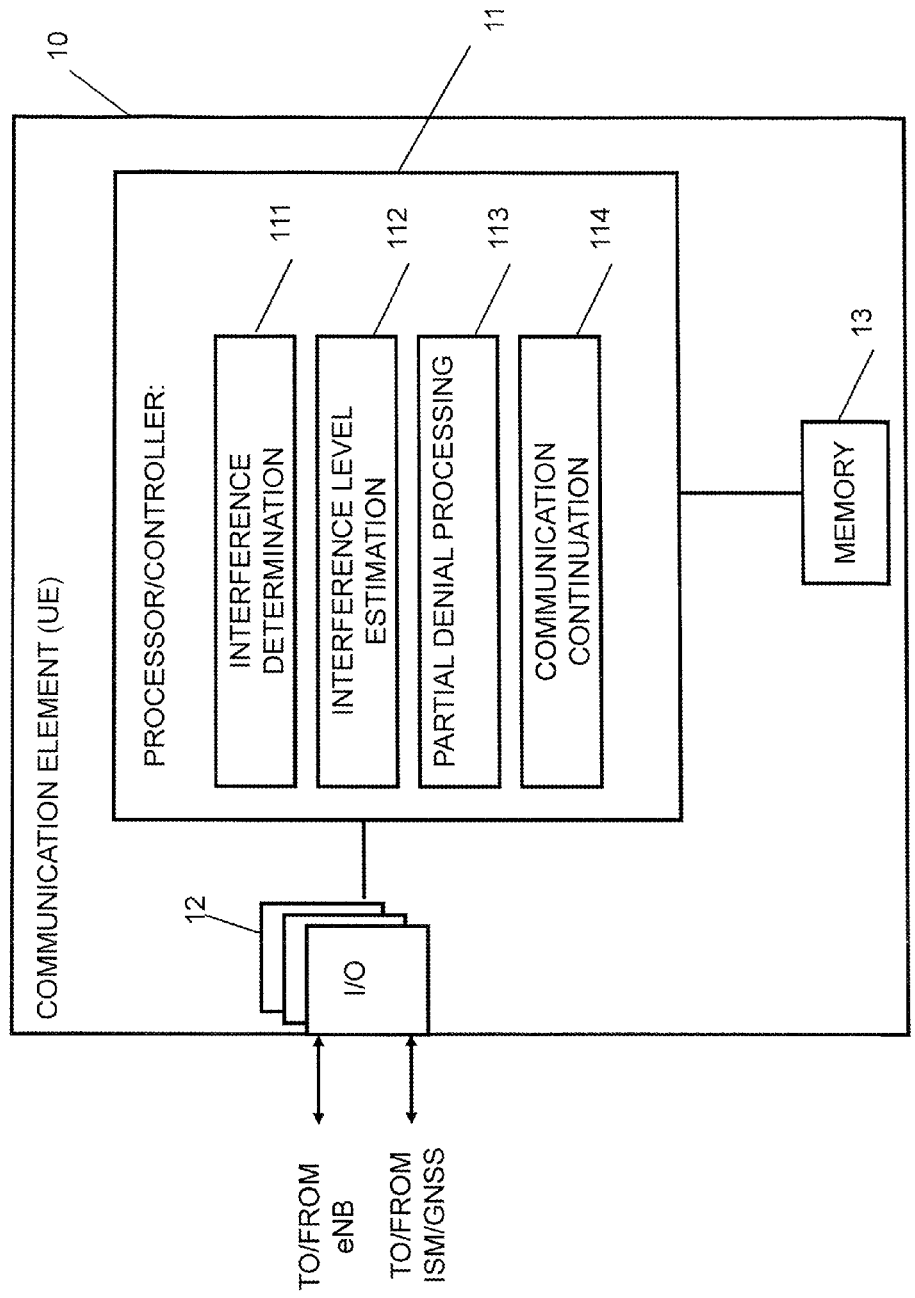
FIG. 7 shows a block circuit diagram of a communication element including processing portions conducting functions according to embodiments.

In FIG. 7, a block circuit diagram illustrating a circuitry indicating a configuration of a communication element, such as UE 10, is shown, which is configured to implement the processing for controlling communications as described in connection with embodiments. That is, a circuitry is shown which comprises at least one processor and at least one memory including computer program code the at least one memory and the computer program code being configured to, with the at least one processor, cause the UE 10 to perform functions described below, for example by executing a corresponding algorithm. It is to be noted that the communication element or UE 10 shown in FIG. 7 may comprise several further elements or functions besides those described herein below, which are omitted herein for the sake of simplicity as they are not essential for understanding embodiments. Furthermore, even though reference is made to an UE, the communication element may also be another device having a similar function, such as a modem chipset, chip, module etc., which can also be part of a device such as a UE or attached as a separate element to a UE, or the like.

The communication element or UE 10 may comprise a processing system or function or processor 11, such as a CPU or the like, which executes instructions given by programs or the like related to the control signal transmission control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes transceiver or input/output (I/O) units connected to the processor 11. The I/O units 12 may be used for communicating with a communication network control element such as eNB 20 and a communication network or system such as ISM server 30 or GNSS system 35. The I/O unit 12 may be a combined unit comprising communication equipment towards several network elements, or may comprise a distributed structure with a plurality of different interfaces for different network elements (see e.g. FIG. 2). Reference sign 13 denotes a memory usable, for example, for storing data and programs to be executed by the processor 11 and/or as a working storage of the processor 11.

The processor 11 is configured to execute processing related to the above described mechanism for controlling communications. In particular, the processor 11 comprises a sub-portion 111 as a processing portion which is usable for determining an interference situation. The portion 111 may be configured to perform processing according to step S100 of FIG. 6, for example. Furthermore, the processor 11 comprises a sub-portion 112 usable as a portion for estimating an interference level. The portion 112 may be configured to perform processing according to steps S110 and S120 of FIG. 6, for example. In addition, the processor 11 comprises a sub-portion 113 as a processing portion which is usable for conducting the partial denial processing for the UL communication. Furthermore, the processor 11 comprises a sub-portion 114 as a processing portion which is usable for continuing the communication on resources being not determined to be disabled (different from RBs indicated in the dedicated part of RBs to be deactivated) i.e. for conducting the partial autonomous denial operation. The portions 113 and 114 may be configured to perform processing according to steps S130 and S140 of FIG. 6, for example.

In the following, further embodiments are described. In the preceding examples of embodiments, the UE 10 is arranged to conduct the partial autonomous denial operation on its own. However, in this situation, a communication network control element, such as the eNB 20, with which the deactivated communication is conducted (e.g. UL1 and/or UL2) may be not sufficiently involved in this deactivation procedure. Therefore, in the following, embodiments are described where the coordination scheme according to FIG. 5b is assumed, i.e. where the interference control is conducted by the communication element or UE 10 with assistance by the eNB 20, for example. That is, in order to ensure, for example, that an operation of the communication network control element is not distorted by the partial deactivation of RBs, or in cases where usage of a partial autonomous denial is restricted by the network operator, further embodiments are discussed which provide an alternative communication control using another partial denial procedure.

According to the present embodiments, the communication network control element with which the UE 10 conducts the first communication of which part of RBs is to be deactivated performs parts of the deactivation procedure. That is, when the UE 10 determines that there is (potential) interference situation, which may or may not be followed by a determination of whether the interference level is critical or not in the UE 10, then the present partial denial procedure comprises a signaling from the UE 10 to the eNB 20 which indicates that there is an interference situation to be considered, and a result of a determination of the RBs causing a predetermined amount of interference, for example. In other words, according to the present embodiments, instead of conducting the partial autonomous denial, the UE 10 sends an interference report message to the eNB 20 in which the interference causing resources (e.g. indication of RBs determined to be in the dedicated part of RBs to be deactivated) are reported.

In other words, the UE 10 reports the sources of the IDC interference to the eNB 20 with such a level of detail that the network (the eNB 20) is able to take appropriate actions. This comprises that only a part of a CC (according to the dedicated part of RBs) is disabled while other parts of the CC (corresponding to different RBs) are kept operational. For example, the network may start giving UL grants to the UE 10 in such a way that the UE 10 will not transmit on such frequencies or RBs that cause harmful interference, according to the interference report. Furthermore, the network may synchronize the extent of UL grants so that only partial CC bandwidth are used at those times when the UE receives the signal of the victim RAT (i.e. when the system suffers from the interference).

According to embodiments, the UE takes care of several parts of the IDC interference assessment. Therefore, according to an embodiment, it is sufficient that the UE 10 tells the network (the eNB 20) which RBs are harmful for other reception operations, for example in the form of the interference report. That is, the UE 10 just gives a list of RBs that need to be taken out of use in order to adequately help the IDC operations (mitigate the interference).

According to further embodiments, the eNB 10 performs a greater role in the decision as to which resources are actually to be deactivated. For example, according to an alternative embodiment, when intermodulation is a problem in a case where more than one UL communication (i.e. two or more CCs are used), the RBs can be denied on either CC for achieving mitigation of the interference. Hence, according to embodiments, the information provided by the UE 10 for reporting the interference situation and the RBs causing the interference (i.e. the information indicating a dedicated part of RBs to be deactivated) has at least one of the following properties:

- the information comprises a list of known alternative solutions for solving the interference situation (for example different RBs in different CCs when more than one CC is used)
- each alternative solution indicated in the information comprises a set of frequencies or resources that should be removed to get rid of the interference
- each set of frequencies is a list of CCs and a set of RBs within each CC (dedicated part of RBs)
- the set of RBs within each CC is expressed as one of a list, a bitmap, a list of ranges, or any combination of these, wherein each range can be expressed as first and last RB identification or an identification of the first RB and the number of consecutive RBs According to further embodiments, the eNB 20 is arranged to freely select one of the alternatives indicated in the UE report.

Furthermore, according to embodiments, the eNB 20 is not bound on the indications given in the UE report. That is, the information/list given by the UE is to be considered only to be in the order of preference, possibly in the order of efficiency. The network may take the UE preferences into account, but it may take the network specific factors into account as well, i.e. disable at the end not all or different of the resources indicated in the information from the UE. Network factors may be, for example, one of those indicated above with regard to a selection process, such as a non allowance setting for denial or the like.

On the basis of information provided by the interference report, the eNB 20 conducts a partial denial processing for controlling disabling of corresponding resources (RBs) on the UL communication, e.g. on the basis of the dedicated part of RBs to be deactivated as indicated in the interference report. In other words, the reported interference situation, such as the intermodulation interference, is solved by deactivating a part of RBs on (one of) the CC.

For the deactivation of part of the UL communication, the eNB 20 instructs, for example, a scheduler portion of the eNB 20 to stop providing UL grants for the determined RBs, while for the RBs different from these dedicated part of RBs to be deactivated UL grants can still be provided. This means that the UL communication is still conducted by using these different RBs.

Figure 8:
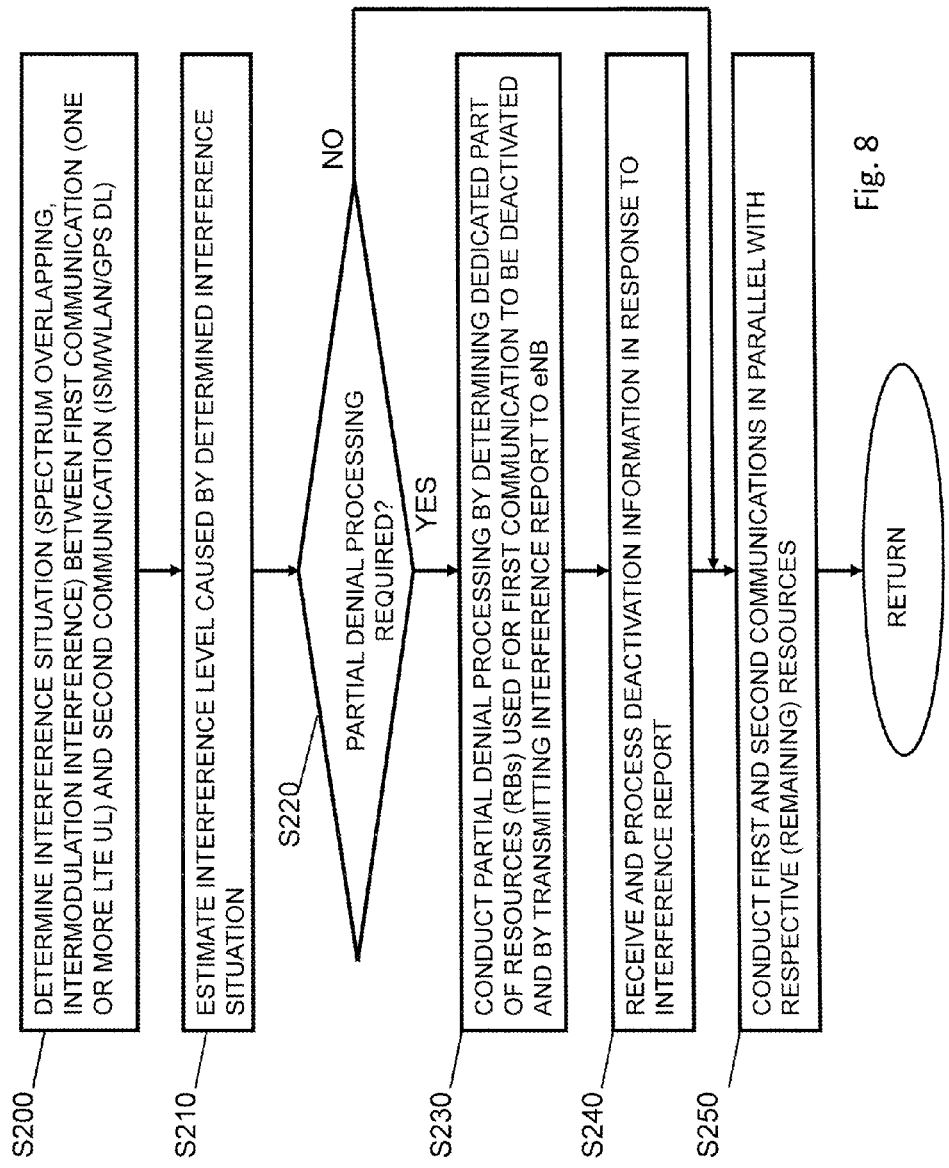
FIG. 8 shows a flow chart illustrating a procedure conducted by a communication element according to an embodiment.

FIG. 8 shows a flow chart illustrating a procedure conducted by a communication element, such as UE 10 as shown in FIG. 1, according to the present embodiment.

It is to be noted that steps S200 to S220 are similar to steps S100 to S120 according to the preceding embodiments described in relation to FIG. 6. That is, in step S200, an interference situation (e.g. IMD2 appearing at least partially of top of for instance used ISM channel, frequency spectrum overlapping, or the like) caused between a first communication performed on at least one frequency band (e.g. the UL1 communication and/or UL2 communication) and a second communication performed on another frequency band different from the at least one frequency band of the first communication (e.g. the DL communication on WLAN band) is determined, for example on the basis of a comparison between scheduled or estimated timings for transmissions in the first communication (e.g. the UL allocation grants) and scheduled or estimated timings for a transmission in the second communication (e.g. expected or known reception time in DL WLAN communication).

In step S210, an interference level estimation is conducted as described in connection with step S110, wherein on the basis of the interference level estimation (threshold comparison) in step S220 a decision is made as to whether the partial denial procedure is conducted (YES in S220) or the partial denial procedure is stopped (NO in step S220) and the first and second communications are continued unchanged (step S250).

Similar to the procedure according to FIG. 6, it is to be noted that steps S210 and S220 may also be omitted in further embodiments, i.e. the deactivation is executed as soon as an interference situation is determined (step S230 follows to step S200).

In step S230, the partial denial procedure described above is initiated. That is, according to the present embodiments, the RBs forming the dedicated part of RBs of the first (UL) communication causing a specific amount of interference on the second (DL) communication are determined, e.g. in a selection process for selecting corresponding RBs and possibly CCs (in case more than one CC is used) based e.g. on the above described criteria. Furthermore, an interference report is transmitted to the eNB 20 informing about the interference situation and indicating the resources to be deactivated (i.e. according to the alternative solutions for solving the interference situation), i.e. the dedicated part of RBs to be deactivated.

In step S240, in response to the signaling in step S230, a message from the eNB 20 is received in which information regarding the deactivation of resources (RBs, frequencies etc.) are provided, for example in the UL grants for only those RBs different from the dedicated part of RBs to be deactivated, or according to a selection carried out by the eNB 20.

In step S250, the first communication is continued in parallel with the second communication wherein on the basis of the processing in step S240 only allowed resources (RBs different from those indicated in the dedicated part of RBs to be deactivated) are used for communicating in the first UL communication.

Figure 9:
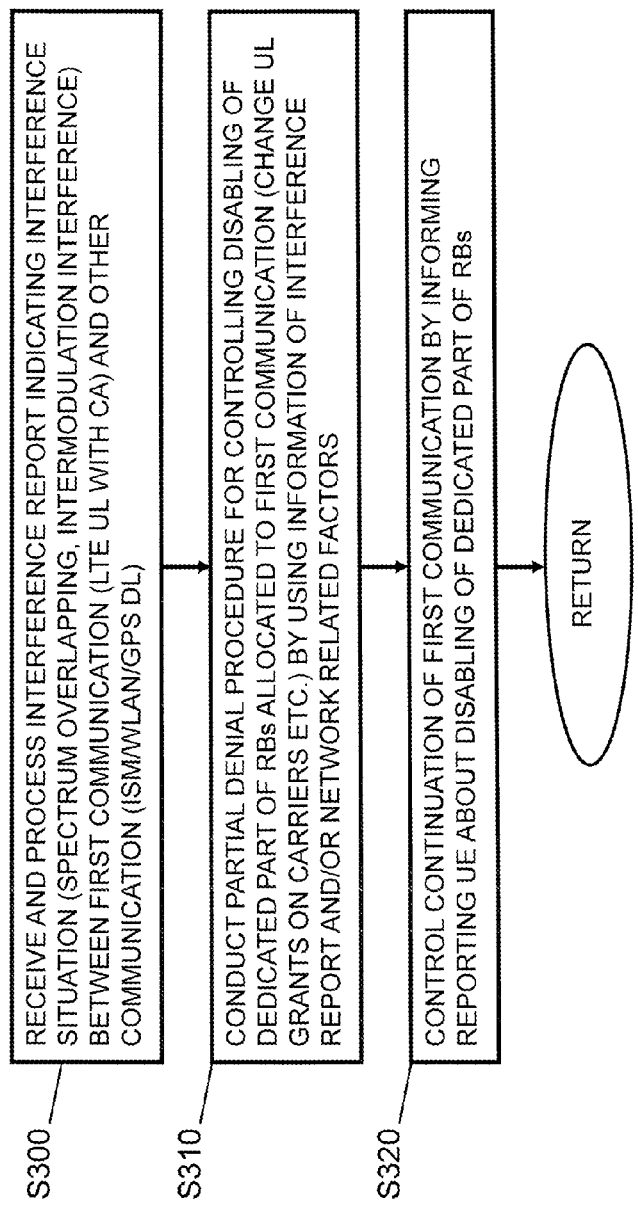
FIG. 9 shows a flow chart illustrating a procedure conducted by a communication network control element according to an embodiment.

FIG. 9 shows a flow chart illustrating a procedure conducted by a communication network control element, such as eNB 20 as shown in FIG. 1, according to the present embodiment. The procedure according to FIG. 9 is the counterpart of the UE procedure according to FIG. 8, for example.

In step S300, an interference report is received and processed. The interference report indicates an interference situation (e.g. IMD2) caused between a first communication (e.g. UL1 communication and/or UL2 communication) performed on at least one frequency band and another communication performed on another frequency band (e.g. a WLAN band, but this information is not necessarily provided in the interference report when not being of relevance for the partial denial procedure) different from the at least one frequency band of the first communication. Furthermore, the interference report comprises information about resources to be deactivated (i.e. according to the alternative solutions for solving the interference situation), i.e. the dedicated part of RBs to be deactivated, of (at least one) CC of the first communication.

In step S310, the eNB 20 conducts a partial denial processing by controlling disabling part of the resources used for the first communication. That is, for example, the dedicated part of RBs to be deactivated as indicated in the interference report is used as a basis for deciding on which RBs are to be disabled for the first communication and which RBs are still allowed, wherein also network factors are considered in the decision. Then, a transmission time scheduler or the like is caused to provide only such UL grants for RBs different from that decided to be disabled on the CCs of the first communication.

In step S320, a response to the interference report is transmitted informing the UE 10 about the partial deactivation of RBs for the first communication, e.g. by providing UL grants for RBs being different thereto. That is, the continuation of the first communication in parallel to the other (second) communication is controlled.

Figure 10:
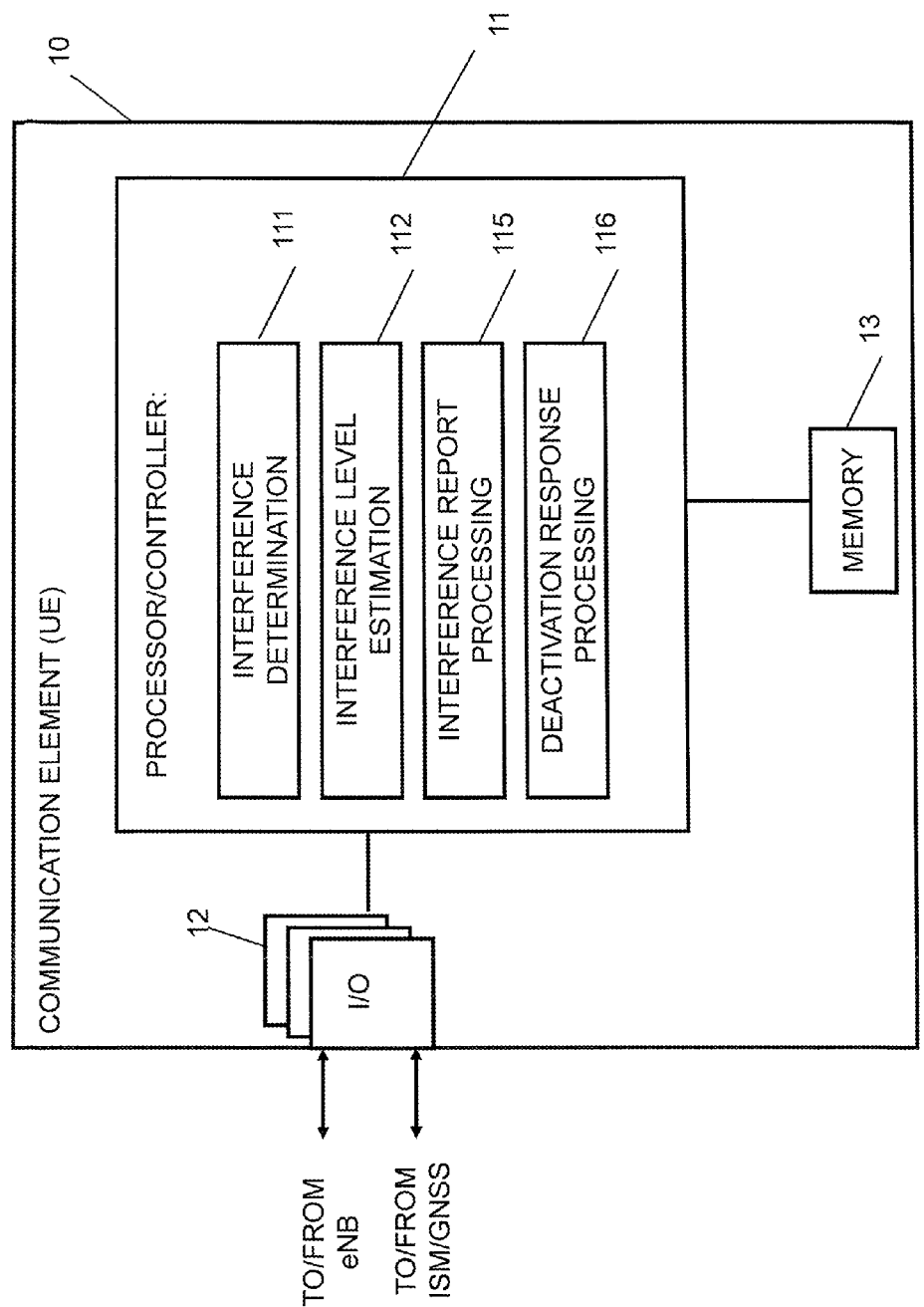
FIG. 10 shows a block circuit diagram of a communication element including processing portions conducting functions according to embodiments.

In FIG. 10, a block circuit diagram illustrating a circuitry indicating a configuration of a communication element, such as UE 10, is shown, which is configured to implement the above described processing for controlling communications of the present embodiments. That is, a circuitry is shown which comprises at least one processor and at least one memory including computer program code the at least one memory and the computer program code being configured to, with the at least one processor, cause the UE 10 to perform functions described below, for example by executing a corresponding algorithm. It is to be noted that the communication element UE 10 shown in FIG. 10 may comprise several further elements or functions besides those described herein below, which are omitted herein for the sake of simplicity as they are not essential for understanding embodiments. Furthermore, even though reference is made to an UE, the communication element may be also another device having a similar function, such as a modern chipset, chip, module etc., which can also be part of a device such as a UE or attached as a separate element to a UE, or the like.

It is to be noted that parts of the configuration of the communication element according to FIG. 10 are similar to respective parts of the configuration of the communication element according to FIG. 7 so that the same reference signs are used.

The communication element or UE 10 may comprise a processing system or function or processor 11, such as a CPU or the like, which executes instructions given by programs or the like related to the control signal transmission control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes transceiver or input/output (I/O) units connected to the processor 11. The I/O units 12 may be used for communicating with a communication network control element like eNB 20 and a communication network or system like ISM server 30 or GLASS system 35. The I/O unit 12 may be a combined unit comprising communication equipment towards several network elements, or may comprise a distributed structure with a plurality of different interfaces for different network elements (see e.g. FIG. 2). Reference sign 13 denotes a memory usable, for example, for storing data and programs to be executed by the processor 11 and/or as a working storage of the processor 11.

The processor 11 is configured to execute processing related to the above described mechanism for controlling communications. In particular, the processor 11 comprises a sub-portion 111 as a processing portion which is usable for determining an interference situation. The portion 111 may be configured to perform processing according to step S200 of FIG. 8, for example. Furthermore, the processor 11 comprises a sub-portion 112 usable as a portion for estimating an interference level. The portion 112 may be configured to perform processing according to steps S210 and S220 of FIG. 8, for example. In addition, the processor 11 comprises a sub-portion 115 as a processing portion which is usable for partial denial processing and generating the interference report. The portion 115 may be configured to perform processing according to step S230 of FIG. 8, for example. Furthermore, the processor 11 comprises a sub-portion 116 as a processing portion which is usable for receiving and processing a deactivation response. The portion 116 may be configured to perform processing according to step S240 of FIG. 8, for example.

Figure 11:
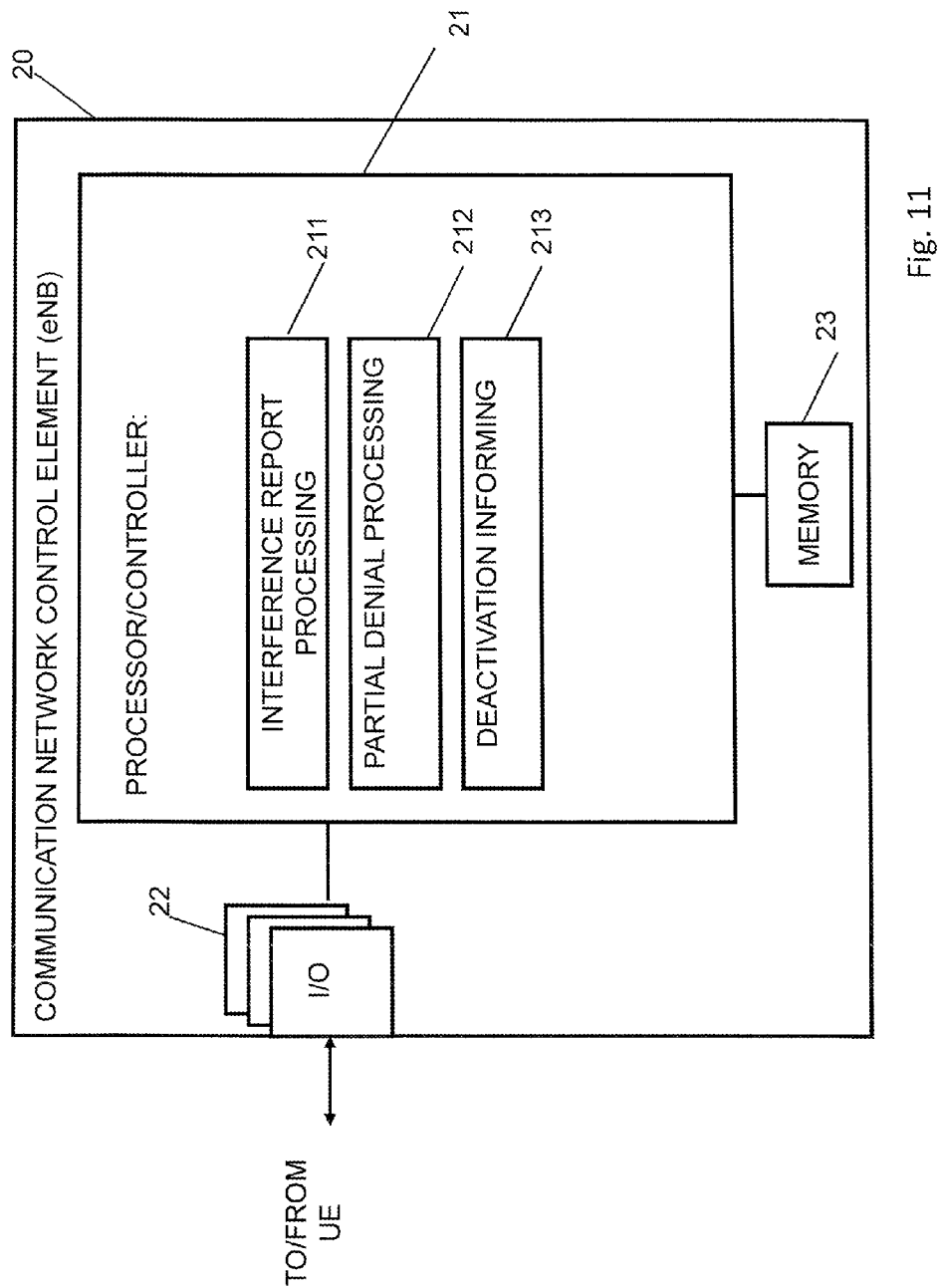
FIG. 11 shows a block circuit diagram of a communication network control element including processing portions conducting functions according to embodiments.

In FIG. 11, a block circuit diagram illustrating a circuitry indicating a configuration of a communication network control element, such as of the eNB 20 shown in FIG. 1, is shown, which is configured to implement the processing for controlling communications as described in connection with the present embodiments. That is, a circuitry is shown which comprises at least one processor and at least one memory including computer program code the at least one memory and the computer program code being configured to, with the at least one processor, cause the eNB 20 to perform functions described below, for example by executing a corresponding algorithm. It is to be noted that the communication network control element or eNB 20 shown in FIG. 11 may comprise several further elements or functions besides those described herein below, which are omitted herein for the sake of simplicity as they are not essential for understanding embodiments. Furthermore, even though reference is made to an eNB, the communication network control element may be also another device having a similar function, such as a modern chipset, chip, module etc., which can also be part of a base station or eNB or attached as a separate element to a base station or eNB, or the like.

The communication network control element or eNB 20 may comprise a processing system or function or processor 21, such as a CPU or the like, which executes instructions given by programs or the like related to the control signal transmission control. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes transceiver or input/output (I/O) units connected to the processor 21. The I/O units 22 may be used for communicating with one or more communication elements, such as UE 10. The I/O units 22 may be a combined unit comprising communication equipment towards several of the network element in question, or may comprise a distributed structure with a plurality of different interfaces for each network element in question. Reference sign 23 denotes a memory usable, for example, for storing data and programs to be executed by the processor 21 and/or as a working storage of the processor 21.

The processor 21 is configured to execute processing related to the above described mechanism for controlling communications, for example. In particular, the processor 21 comprises a sub-portion 211 as a processing portion which is usable for processing an interference report. The portion 211 may be configured to perform processing according to step S300 of FIG. 9, for example. Furthermore, the processor 21 comprises a sub-portion 212 as a processing portion which is usable as a portion for conducting a partial denial processing. The portion 212 may be configured to perform a processing according to step S310 of FIG. 9, for example. Moreover, the processor 21 comprises a sub-portion 213 as a processing portion which is usable as a portion for informing the UE about the deactivation. The portion 213 may be configured to perform processing according to step S320 of FIG. 9, for example.

It is to be noted that according to further embodiments, the UE 10 is configured to signal to the network (i.e. the eNB 20) not only the RBs which are to be deactivated in the currently conducted first communication (e.g. in a following frame or cycle) but those RBs which are likely to be deactivated in the future (permanently or for a certain time period). Such an indication may be given either separately or together with an interference report according to step S230. By means of this indication, the processing of the network (i.e. the eNB 20) is facilitated even in case that it is not involved in the partial denial of (future) communications.

In the following, application examples of different mechanisms for controlling communications according to embodiments and according to comparative examples are described with regard to FIGS. 12 and 13.

Figure 12:
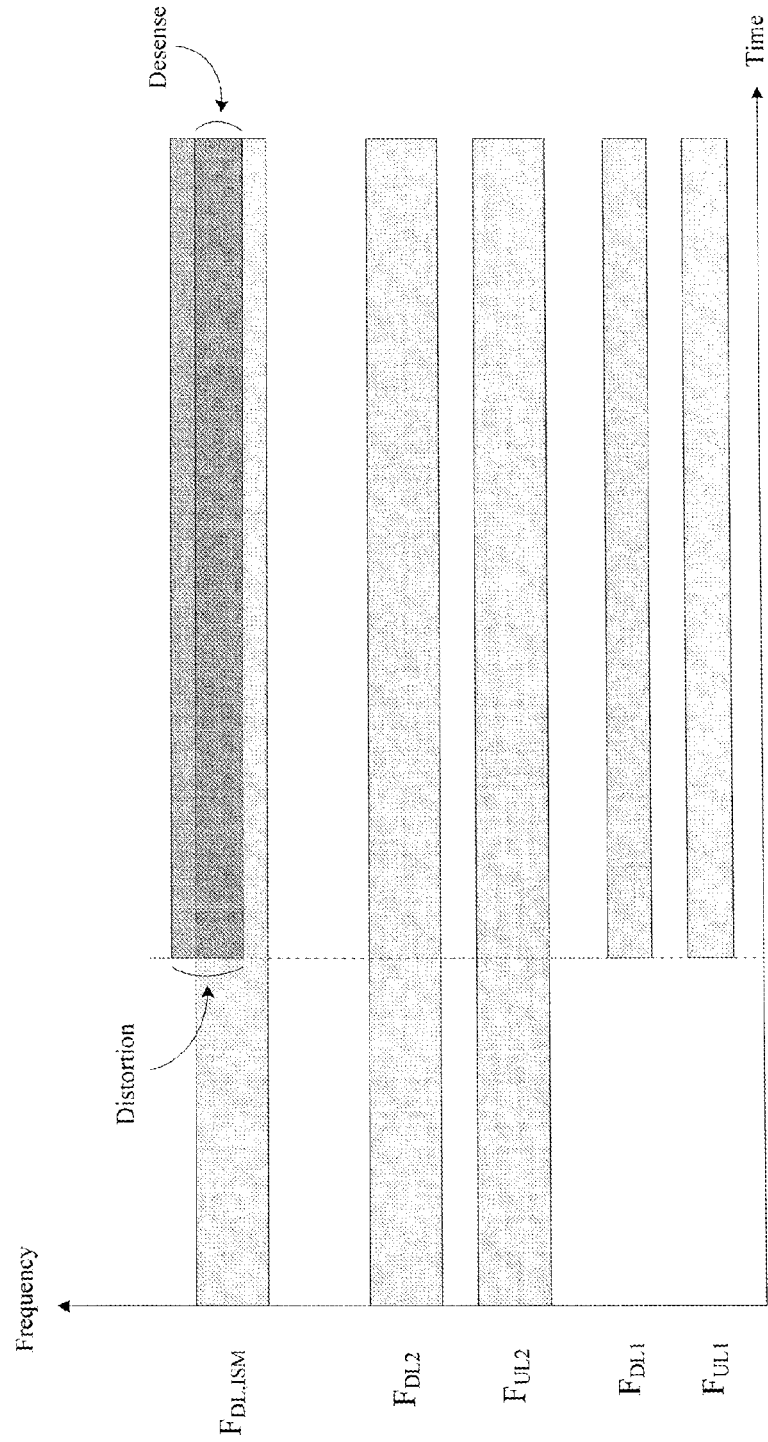
FIG. 12 shows a diagram illustrating a scenario of interference in an IDC communication example.
Figure 13:
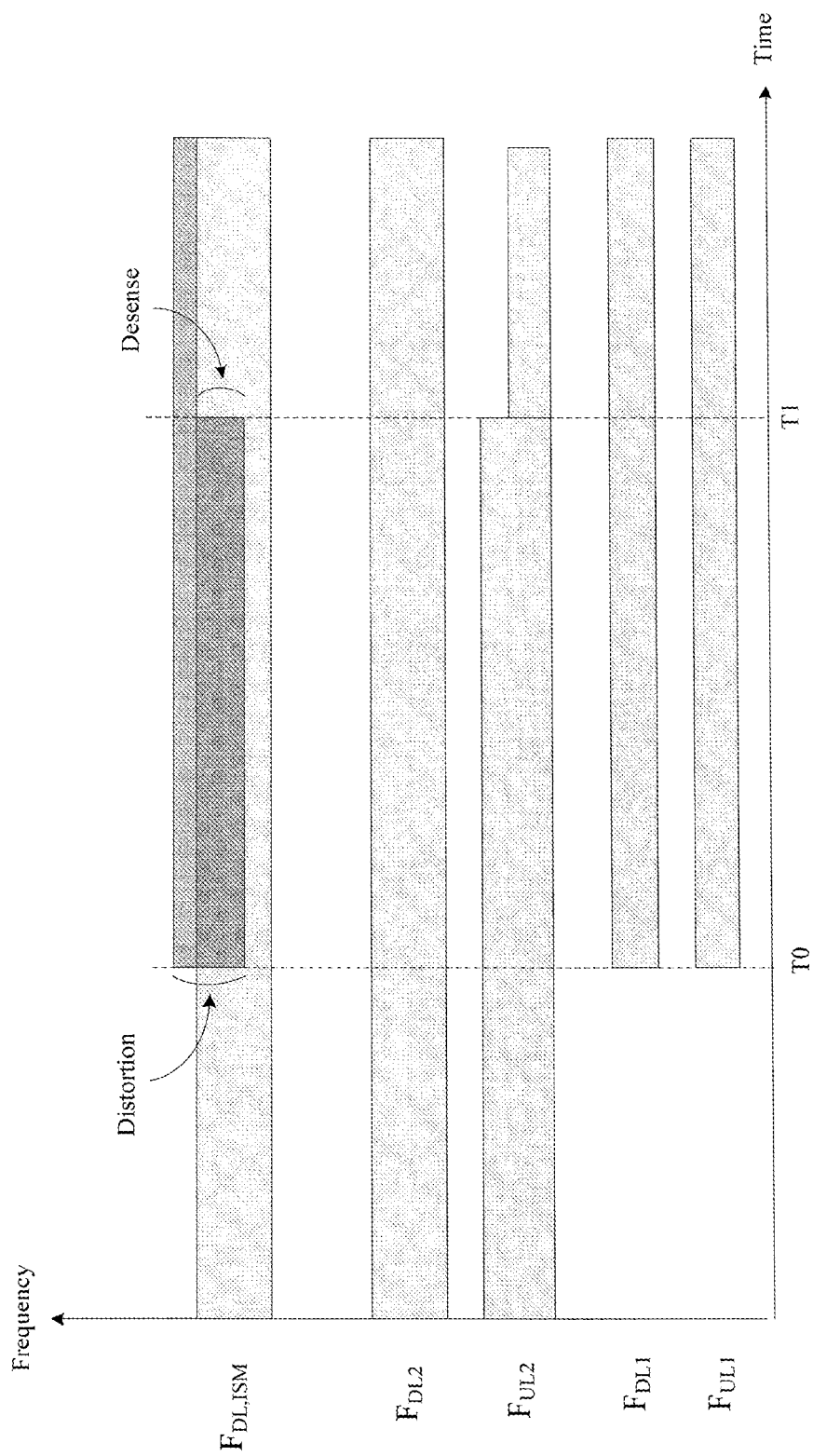
FIG. 13 shows a diagram illustrating a scenario of interference in an IDC communication example according to embodiments.

Specifically, FIGS. 12 and 13 illustrate different scenarios of communications where UL communications in LTE-A using inter-band. CA co-exists with DL communication on an ISM band. In these examples it is assumed that intermodulation distortion caused by the UL communications would appear on top of the ISM channel/band, for instance WLAN, as described in connection with FIG. 4. In the diagrams according to FIGS. 12 and 13, the ordinate indicates different frequency ranges, i.e. $F_{DL\_ISM}$ for the DL communication on the ISM band, $F_{DL1}$ and $F_{DL2}$ as well as $F_{UL1}$ and $F_{UL2}$ for the UL communications in the LTE-A frequency range, respectively, while the abscissa indicates the time. That is, the communications conducted on the respective UL and DL bands as well as distortion (IMD2, H3) and desense are shown in a time based manner.

In FIG. 12, a comparative example is shown where it is assumed that no partial denial procedure described above is conducted. That is, as shown in FIG. 12, two UL communications (CA mode) and corresponding DL communications are active between the UE 10 and the eNB 20, for example (LTE or LTE-A based communications, for example), and DL communication on ISM band is active simultaneously, wherein a corresponding distortion and desense at the ISM DL communication is caused, as described above. In other words, in the comparative example, the ISM DL communication suffers from desense since two aggregated UL communications cause distortion on the ISM DL communication. As a result, the ISM receiver is facing severe desense and suffers from degraded link quality and capacity loss.

In FIG. 13, on the other hand, a case is shown where embodiments are implemented for conducting the partial denial procedure. Specifically, as shown in FIG. 13, at time T0, distortion and desense as described in connection with FIG. 12 are caused, while at time T1 a partial denial procedure as described above is conducted. In other words, in order to mitigate the ISM RX desense in the period between T0 and T1, a part of LTE UL resources is denied or disabled while the remaining part of the resources are maintained to be active. Due to this partial denial, the distortion caused on ISM DL communication can be avoided or at least decreased. In the example shown in FIG. 13, a part of the UL2 communication is denied from time T1. However, it is also possible to deny a corresponding part of the UL1 communication resources. According to the present embodiments, the reason for distortion causing desense can be an intermodulation result due to both of the ULs or harmonic component of either of the ULs. Depending on the CA case (aggressor) and victim DL, the UL resources which are to be partially denied can be computed, for example by using data from above described Table 1.

It is to be noted that even though not illustrated in FIG. 13, in case a scenario as indicated in FIG. 23 is assumed (two or more UL communications causing distortion/desense on (own) DL communications), a partial denial of resources would lead to a comparable result as that shown in FIG. 13, i.e. desense assumed to be present on $F_{DL1}/F_{DL2}$ is avoided/mitigated in correspondence with that shown in FIG. 13 with regard to $F_{DL,ISM}$.

While in the examples presented above with regard to FIG. 13 a case is described where the partial denial procedure is applied when two or more LTE or LTE-A based UL communications in CA mode are conducted, causing intermodulation interference on top of the ISM band DL communication, in the following, embodiments are considered where a partial denial procedure is used in a single LTE link+ISM interference case, i.e. where only one LTE or LTE-A based UL communication causes interference on an ISM based communication.

The spectrum of a transmitter for a first communication, such as an LTE-A transmitter, can overlap with the spectrum of a receiver of a second communication, such as an ISM receiver, wherein desense to the channels of the second communication which are closest to the first communication (the LTE UL communication) are caused.

Figure 14:
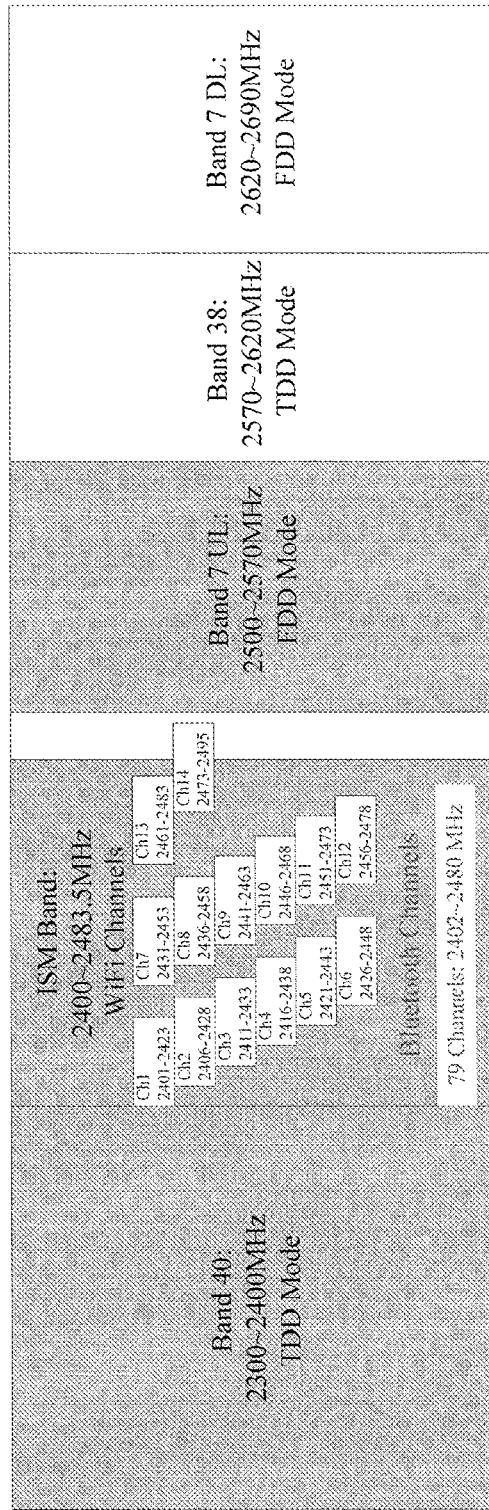
FIG. 14 shows a diagram illustrating a distribution of frequency bands for different types of communications.

FIG. 14 provides an overview of a distribution of frequency spectra in different communication systems. Specifically, LTE communication bands such as Band 40, Band 7 (UL and DL), Band 38, and ISM communication bands such as WiFi channels and BT channels are indicated in relation to each other by referring to their respective frequency ranges. For example, as shown in FIG. 14, LTE band 7 (or LTE B7) in UL operates in a frequency area of 2500-2570 MHz while WiFi (WLAN) channels can extend up to 2483 MHz or even 2495 MHz (in Japan).

Figure 15:
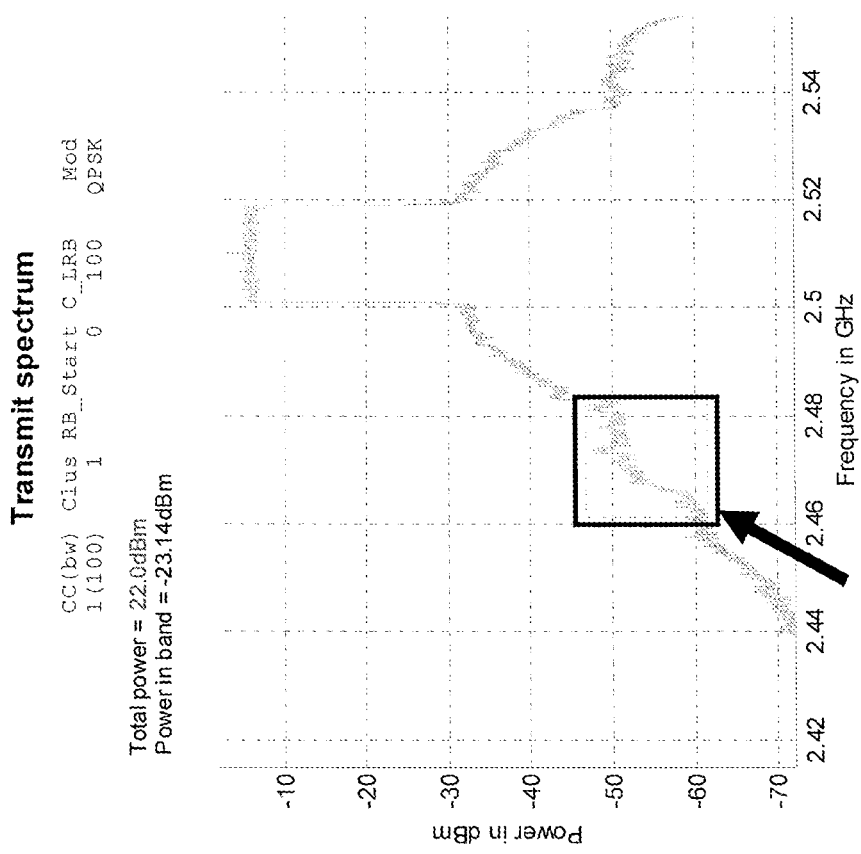
FIG. 15 shows a diagram illustrating an example of an output spectrum of an LTE based communication and a leakage on a WLAN communication.

Due to the proximity of the respective frequency ranges, or even overlapping thereof, distortion and desense on the second communication may be the result when communications are conducted concurrently. In FIG. 15, a diagram is shown illustrating an example of an output spectrum of an LTE based communication (first communication in UL direction) and a leakage on a second communication (WLAN DL communication) is illustrated. Specifically, FIG. 15 shows an example of an LTE20 transmission causing desense on WLAN channel #13. The frequency range being of interest (2461 to 2483 MHz) is indicated by a box in the diagram. According to the example shown in FIG. 15, without any further measure for mitigating distortion (such as partial denial), the total LTE spectrum leakage on the WLAN channel is roughly −23 dBm. Assuming further properties such as a WLAN Rx noise figure of 6 dB, an antenna isolation of 15 dB and an LTE TX filter attenuation of 15 dB, the final result is approximately 40 dB desense.

According to another case (not shown), when an LTE transmission on Band 40 (LTE B40) is assumed, for example, desense on the lowest WLAN channels (e.g. channel #1) may be caused.

In the following, the results which can be achieved when the partial denial procedure is applied in case where a single LTE UL communication and non-3GPP-RAT communication take place (causing interference as discussed above) are described in accordance with several further embodiments.

Figure 16:
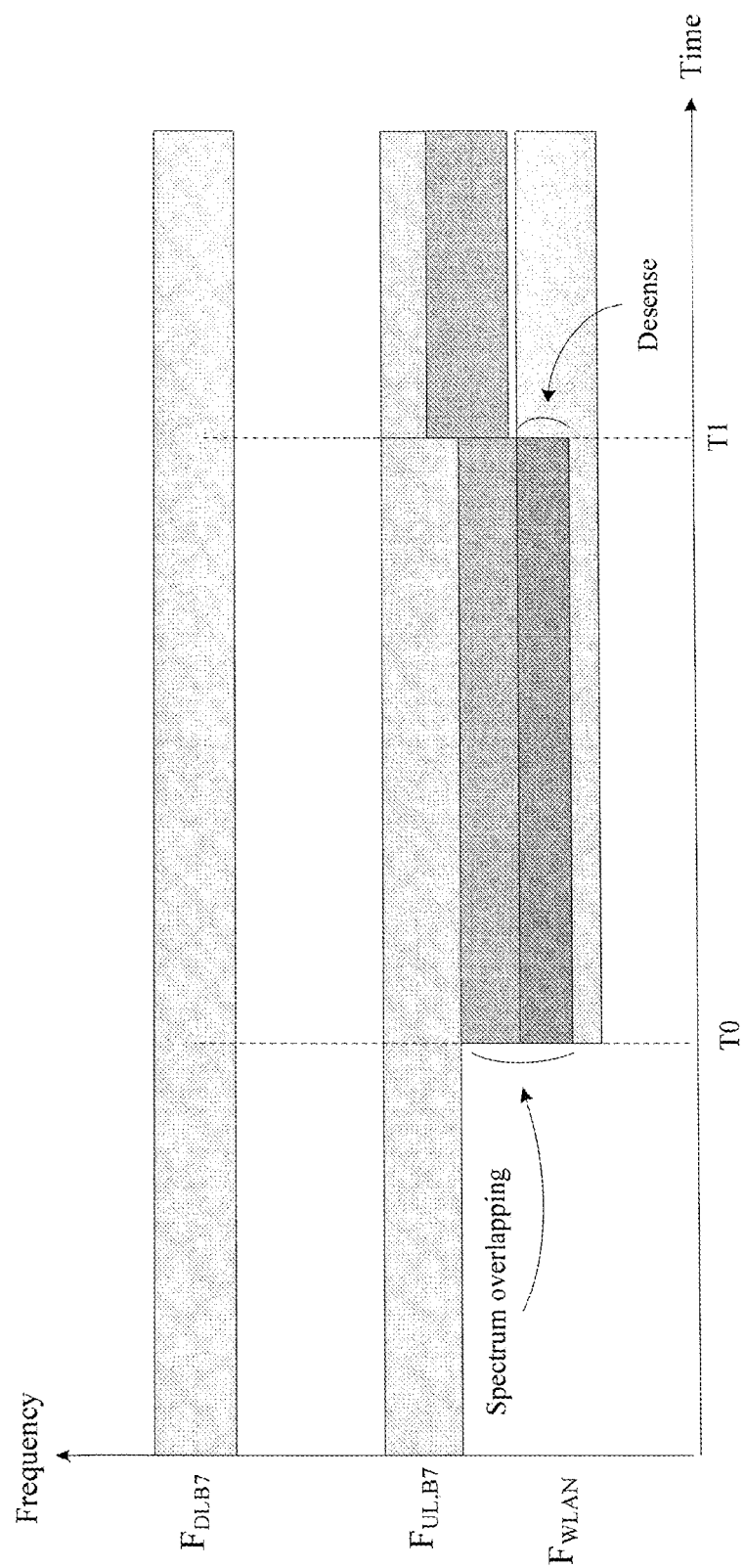
FIG. 16 shows a diagram illustrating a scenario of interference in an IDC communication example according to embodiments.

FIG. 16 shows a diagram illustrating a scenario of communications where one UL communication in LTE-A (e.g. on B7) co-exists with a DL communication on an ISM band (WLAN). In the diagram according to FIG. 16, the ordinate indicates different frequency ranges, i.e. $F_{WLAN}$ for the DL communication on the ISM band, $F_{DLB7}$ and $F_{ULB7}$ for the communications in the LTE-A frequency range, respectively, while the abscissa indicates the time. Specifically, in the time beginning at T0, the UL communication and corresponding DL communication are active between the UE 10 and the eNB 20 (LTE or LTE-A based communications, for example), and the DL communication on the ISM band is active simultaneously, wherein by the spectrum overlapping, a corresponding distortion and desense at the ISM DL communication is caused, as described above. Then, at time T1, the partial denial processing according to one of the above described embodiments is executed. Due to this partial denial, the distortion caused on ISM DL communication can be avoided or at least decreased by disabling a part of the UL communication beginning from time T1. In other words, by conducting a partial denial processing on the LTE B7 communication, desense on ISM channels can be avoided. For evaluating the part of the UL communication to be deactivated, knowledge of active WLAN channel and granted B7 UL allocation is used, as described above.

With regard to FIGS. 17a to 17d, examples of output spectra of an LTE based communication (first communication in UL direction) and a leakage on a second communication (WLAN DL communication) are illustrated wherein a partial denial procedure according to embodiments is implemented, respectively. The examples of FIGS. 17a to 17d show a case of an LTE B7 UL transmission causing desense on WLAN channel #13. The frequency range being of interest (2461 to 2483 MHz) is indicated by a box in the diagrams.

Figure 17A:
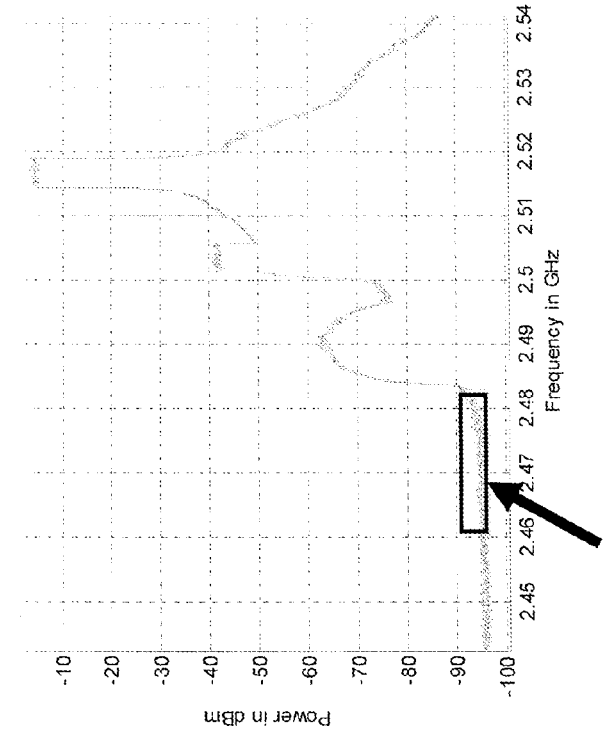
FIGS. 17a to 17d show diagrams illustrating a respective example of an output spectrum of an LTE based communication and a leakage on a WLAN communication when using interference control according to embodiments.
Figure 17B:
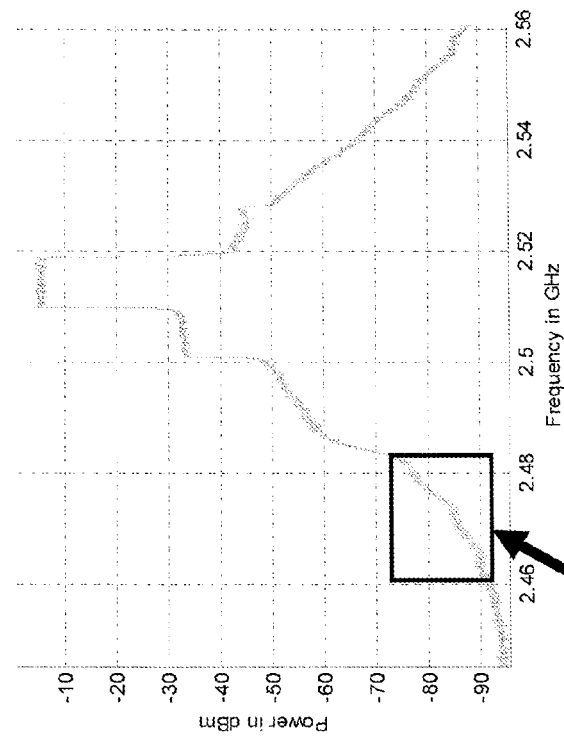
Figures 17C, 17D:
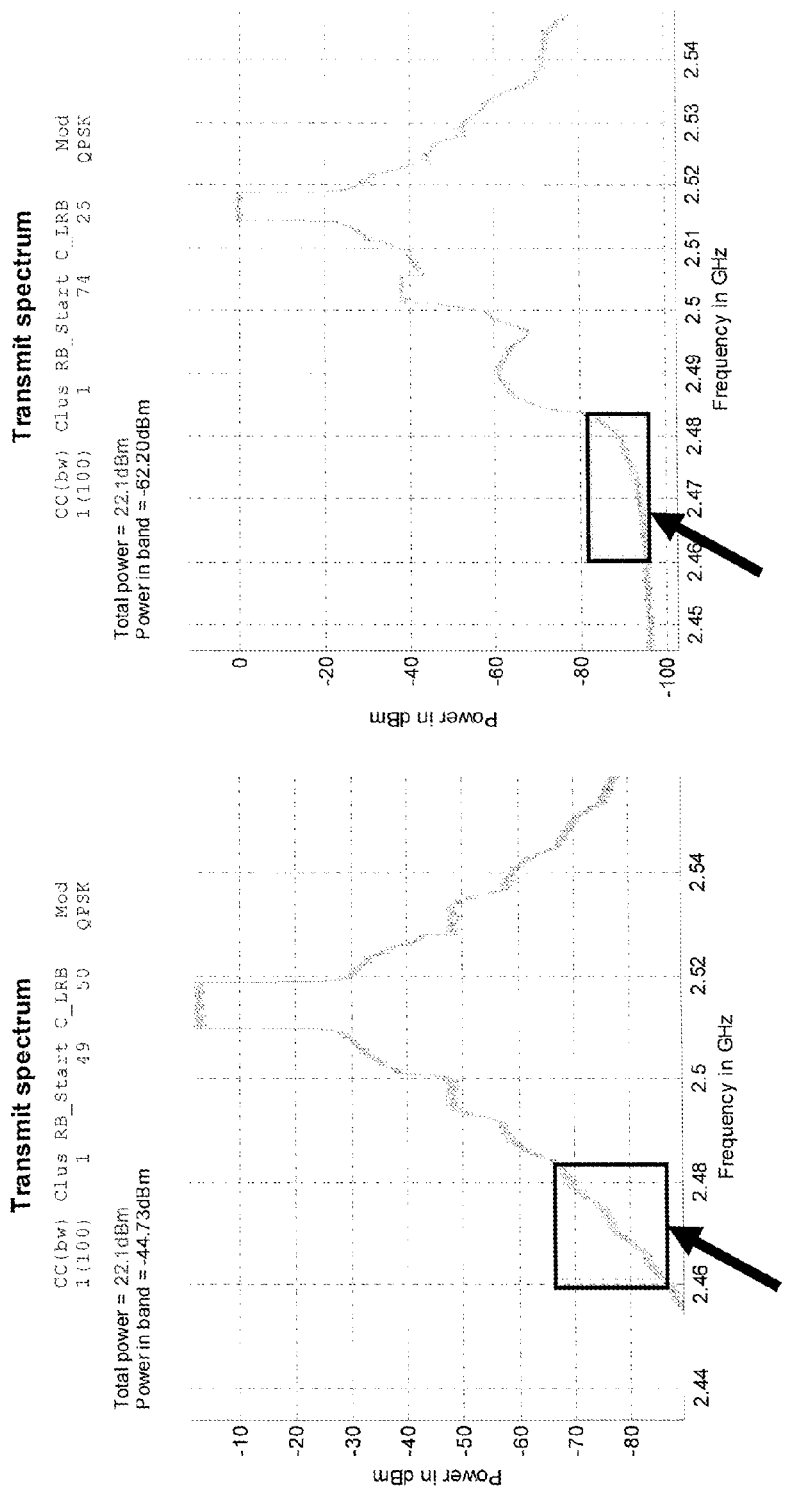

Specifically, FIG. 17a shows a case of a partially denied B7 LTE20 UL communication with 50 RBs and a constant PSD, FIG. 17b shows a case of a partially denied B7 LTE20 UL communication with 25 RBs and constant PSD, FIG. 17c shows a case of a partially denied B7 LTE20 UL communication with 50 RBs at a maximum output power Pout, and FIG. 17d shows a case of a partially denied B7 LTE20 UL communication with 25 RBs at a maximum output power Pout.

As can be seen in FIGS. 17a and 17b, when LTE20 DL spectrums with only 50 and 25 RBs are transmitted, respectively, and the power spectral density (PSD) is kept constant (when compared to fully allocated transmission with 100 RBs), the TX leakage on WLAN channel #13 is decreased by 30 dB and over 40 dB compared to the case shown in FIG. 15, for example (i.e. to the case without partial denial processing). It is to be noted that keeping a fixed PSD results in lowered total output power. However, if the requested total output power needs to be maintained, e.g. on a maximum level, the resulting output spectrum with 50 and 25 RBs are shown in FIGS. 17c and 17d, respectively, in the cases of FIGS. 17c and 17d, the LTE transmission leakage on WLAN channel #13 is improved by 22 dB and 40 dB (when compared to fully allocated transmission with 100 RBs).

Next, further embodiments are described which provide additional measures for mitigating/avoiding coexistence interferences which may be generated between collocated radio transceivers as depicted in FIG. 2 are described. The following mechanisms can be conducted in addition or alternatively to the measures related to partial denial processing as described above.

Figure 18:
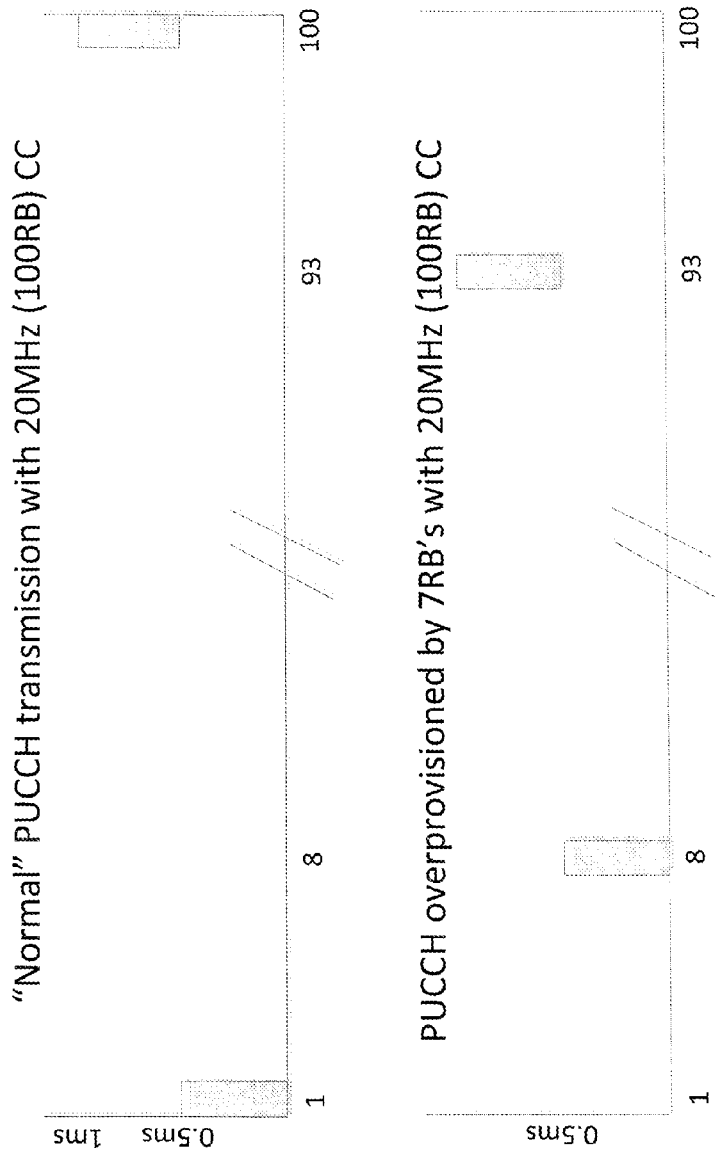
FIG. 18 shows a diagram illustrating a control channel overprovisioning according to embodiments.
Figure 19:
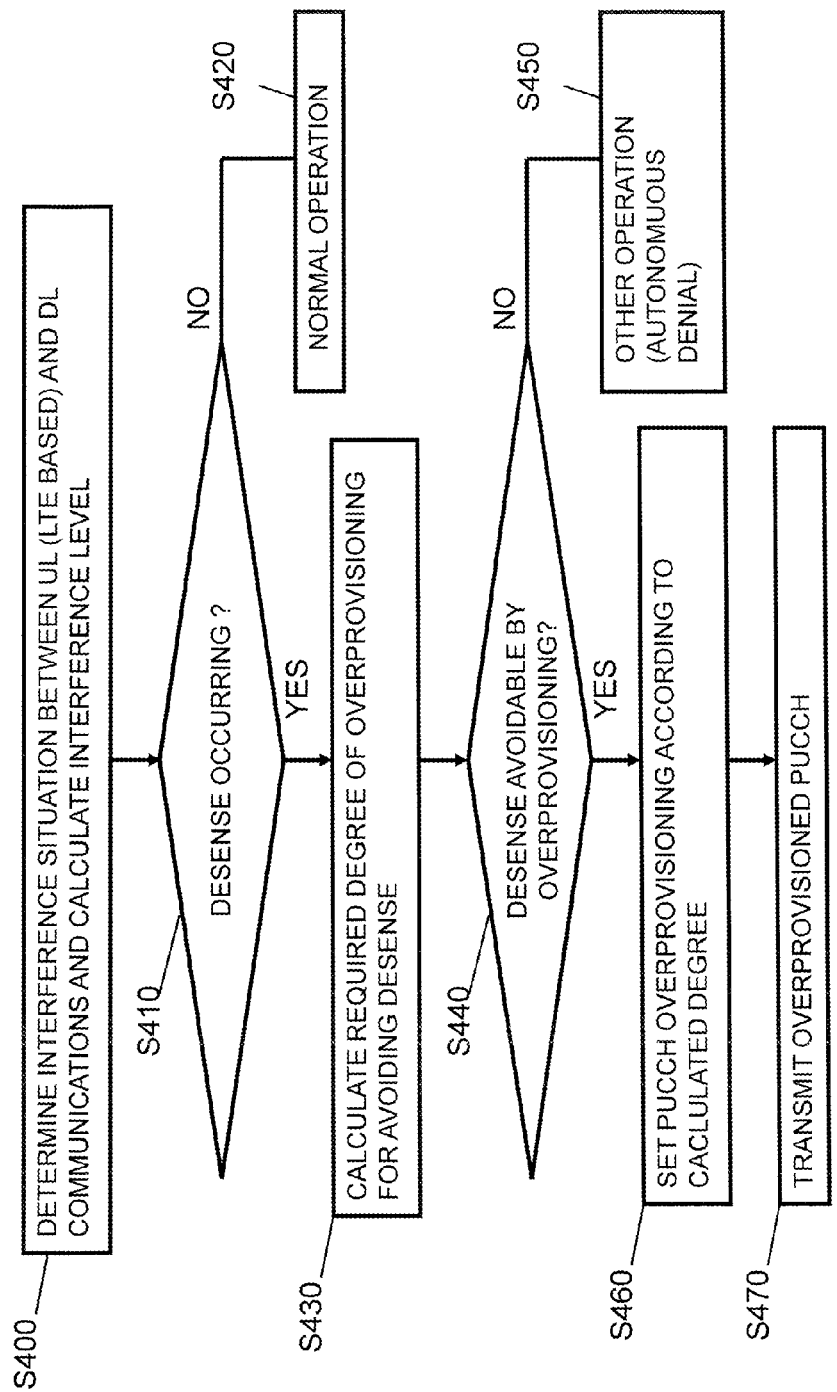
FIG. 19 shows a flow chart illustrating a procedure for controlling execution of interference control mechanisms according to embodiments.

With regard to FIGS. 18 and 19, an example using an over-provisioning of an UL channel, such as PUCCH or PUSCH, is explained. Specifically, an example using PUCCH allocation applied to the IDC scenario is described.

According to embodiments, the co-existence problem (interference etc.) can be avoided by a suitable allocation of either PUSCH RBs or PUCCH RBs. In the case of PUCCH RBs, PUCCH allocation (places of PUCCH RBs) is set by using information from another RAT in the communication element (UE). The place of the PUCCH (i.e. its RBs) is set in such a way that IDC performance degradation is minimized or in an optimal case IDC performance degradation is completely avoided. That is, another RAT (WLAN, etc) can receive at the time the LTE(-A) transmission.

Usually, PUCCH transmission is frequency hopped wherein PUCCH RBs are placed at boundaries with regard to frequency domain. This is indicated in FIG. 18 in the upper half thereof, where an example of a usual RB allocation of PUCCH in a resource block at a channel bandwidth of a CC of 20 MHz (i.e. 100 RBs, 2 slots of 0.5 ms) is shown, i.e. at the edges of the frequency domain. In the lower half of FIG. 18, a case is shown where PUCCH is over-provisioned by 7 RBs, resulting in mitigating UL transmission leakage in certain cases (e.g. Band 13 UL versus Public safety band at 769-775 MHz).

According to embodiments, the operation of flexible PUCCH over-provisioning is based on the fact that the UE knows other RAT reception times a bit in advance, and that the UE knows LTE(-A) transmission times a bit in advance (as described above). Based on this information, the UE is able to deduce whether an LTE(A) transmission would happen concurrently with the other RAT reception, in addition, the UE knows the operation frequencies of the LTE(-A) communication and the other RAT communication conducted in parallel. Hence, the UE can deduce by calculating whether normal transmission (PUCCH at edge) would cause desense to the other RAT communication. Similarly, the UE can also deduce whether possible inter-band CA operation (e.g. PUSCH/not over-provisioned PUCCH on Band x and not over-provisioned PUCCH on Band y for first communication) would cause desense to the other RAT communication (second communication).

In case it is determined that a transmission on the first communication (LTE based UL communication) would happen concurrently with the reception on the second communication (other RAT based DL communication) and that interference to the other RAT communication is caused, according to the present embodiments over-provisioning is conducted.

A process for deciding on whether and which mechanism for mitigating interferences (under participation of a mechanism for partial denial and a mechanism for PUCCH over-provisioning, for example) is depicted in FIG. 19.

In step S400, as an initial calculation, an interference situation between first and second communications (UL and DL communications) is conducted and a level of interference caused thereby is calculated. The processing of step S400 may be in correspondence with that of steps S100 and S110 of FIG. 6, for example.

In step S410, it is determined whether or not a desense at the second (other RAT DL) communication occurs. If the decision in step S410 is negative, step S420 is conducted where normal operation is conducted, i.e. where the first and second communications are conducted without further changes, and where the algorithm according to FIG. 19 is ended until a new interference situation is evaluated.

Otherwise, in case desense is occurring, step S430 is conducted. In step S430, a required degree of over-provisioning is calculated. This is done, for example, by frequency summing/multiplication operations in the UE, wherein for example information stored in a memory or the like (lookup table etc.) are used.

On the basis of the calculation result in step S430, in step S440, it is decided whether the desense can be avoided by the over-provisioning which can be effectively done in the first communication.

If the decision in step S440 results in desense being unavoidable, i.e. that the over-provisioning is not sufficient, step S450 is conducted where another mechanism for mitigating interferences is executed (e.g. a partial denial processing as described above).

Otherwise, in case the decision in step S440 is such that desense can be avoided by over-provisioning, step S460 is conducted where PUCCH over-provisioning is set in accordance with the calculation of step S430. Then, in step S470, the over-provisioned PUCCH is sent, as indicated in FIG. 18 (lower part).

As an example for applying the PUCCH over-provisioning as described above, an IDC case with communication on LTE Band 5 as first communication (UL) and a communication on WLAN as second communication (DL) is mentioned. Specifically, a case is discussed where LTE B5 is at 10 MHz (it is to be noted that it is a decision of the network which BW is to be used) operating on UL to 824-834 MHz (e.g. the operator may own this spectrum and cannot go anywhere else on that band). In the case of PUCCH not being over-provisioned, its third harmonic (H3, see also Table 1) appears on top of the WLAN Channel #13 and disturbs also other high WLAN channels. On the other hand, in the case of PUCCH being suitably over-provisioned as indicated in FIG. 18, then it does not appear on top of channel #13, so that the interference issue is mitigated.

Hence, according to embodiments, there is provided a method and a corresponding apparatus for use in a communication element, the method and apparatus being arranged to conduct the following operation. First, an interference determination is conducted to determine an interference situation caused between a first communication performed on at least one frequency band and a second communication performed on another frequency band different from the at least one frequency band of the first communication. Then, when the interference situation is determined to be present, an over-provisioning degree calculation is conducted so as to determine how much over-provisioning for an UL communication channel of the first communication, such as a control channel like PUCCH, is needed in order not to cause desense on the second communication. If it is determined that desense is avoidable by over-provisioning, transmission settings are adjusted such that over-provisioning of the UL, communication channel of the first communication, such as PUCCH, is set as calculated. Otherwise, another interference mitigation operation is executed, such as a partial denial processing.

Next, a further embodiment is described which provides a further measure for mitigating/avoiding coexistence interferences. In the case of only a moderate amount of autonomous denials being used, it is still possible that the data is delivered correctly, just with a higher block error rate. This fact may be taken into account in a logical channel prioritization.

Logical channel prioritization procedure is applied, for example, when a new transmission is performed. RRC controls the scheduling of UL data by signalling for each logical channel: priority where an increasing priority value indicates a lower priority level, prioritisedBitRate which sets the prioritized bit rate (PBR), and bucketSizeDuration which sets the bucket size duration (BSD). The UE maintains a variable $Bj$ for each logical channel j. $Bj$ shall be initialized to zero when the related logical channel is established, and incremented by the product PBR×TTI duration for each TTI, where PBR is the prioritized bit rate of logical channel j. However, the value of $Bj$ can never exceed the bucket size and if the value of $Bj$ is larger than the bucket size of logical channel j, it is set to the bucket size. The bucket size of a logical channel is equal to PBR×BSD, where PBR and BSD are configured by upper layers.

When the UE is requested to transmit multiple MAC PDUs in one TTI, logical channel priorization can be applied to each grant independently or to the sum of the capacities of the grants. Also, the order in which the grants are processed is left up to UE implementation. It is up to the UE implementation to decide in which MAC PDU a MAC control element is included when UE is requested to transmit multiple MAC PDUs in one TTI. Hence, the UE has full freedom to decide which logical channels are put in which transport block. Consequently, according to embodiments, those logical channels having lower quality of service requirements are placed on those transport blocks or resources which will possibly suffer from IDC interference.

In the following, with reference to FIGS. 20, 21, 22*a* and 22*b*, a further embodiment is described which provides a further measure for mitigating/avoiding coexistence interferences. Specifically, measures for optimizing RFIC performance are provided which are used for TX performance optimization usable to further decrease the amount of interference caused in a coexistence case, e.g. an IDC device.

Figure 20:
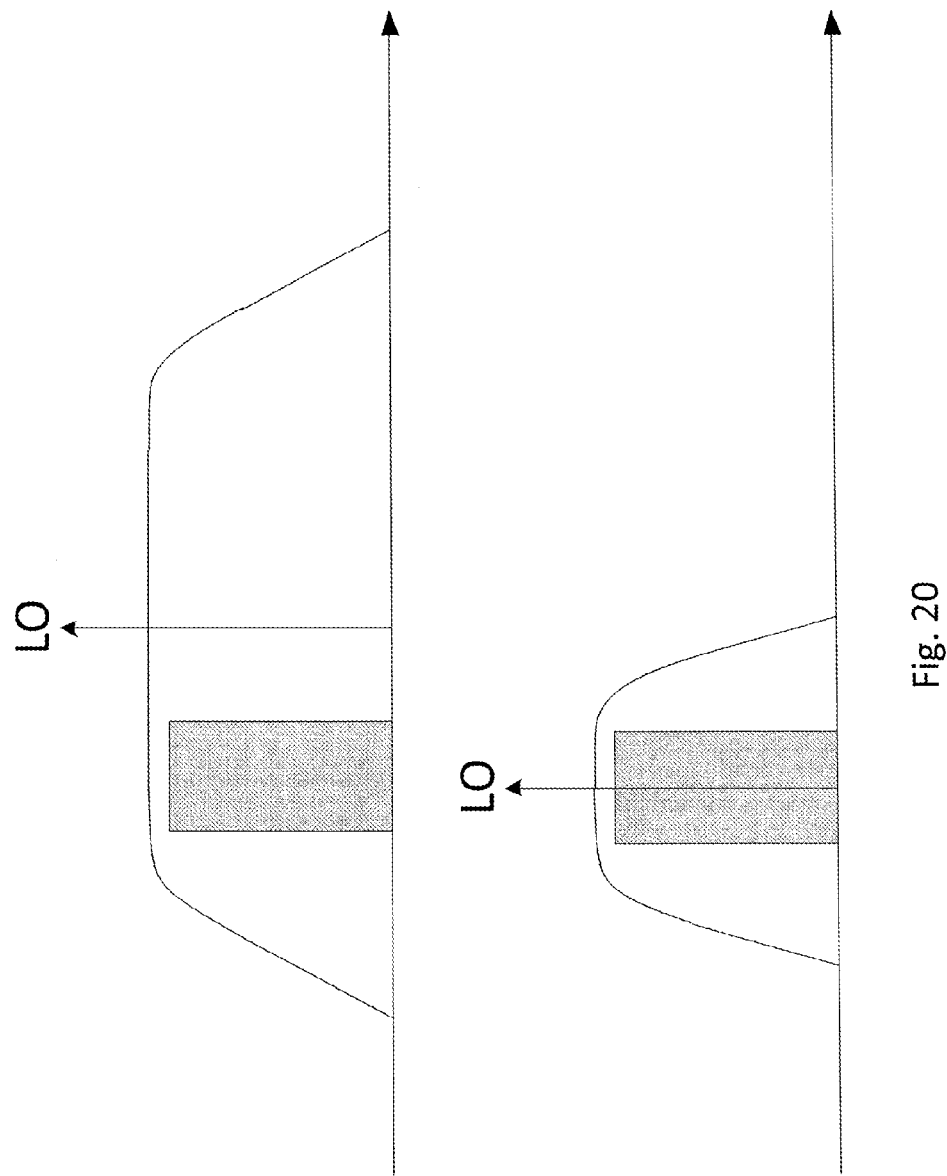
FIG. 20 shows a diagram illustrating a mechanism for transmission optimization according to embodiments.

According to embodiments, RFIC performance can be optimized if the TX analog baseband (BB) filter is configured for narrower bandwidth setup and the local oscillator (LO) is placed to the middle of RBs. This procedure is illustrated in FIG. 20 which shows a diagram illustrating the placement of the LO frequency (arrow in the upward direction) in comparison to an RB frequency area (indicated by a block). In the upper part of FIG. 20, a conventional arrangement is shown where the LO frequency is not arranged according to the RB area, causing a broader bandwidth required. On the other hand, in the lower part of FIG. 20, a scenario is shown where the LO frequency is adjusted or shifted (optimized) to the RB area, resulting in a narrower bandwidth.

Figure 21:
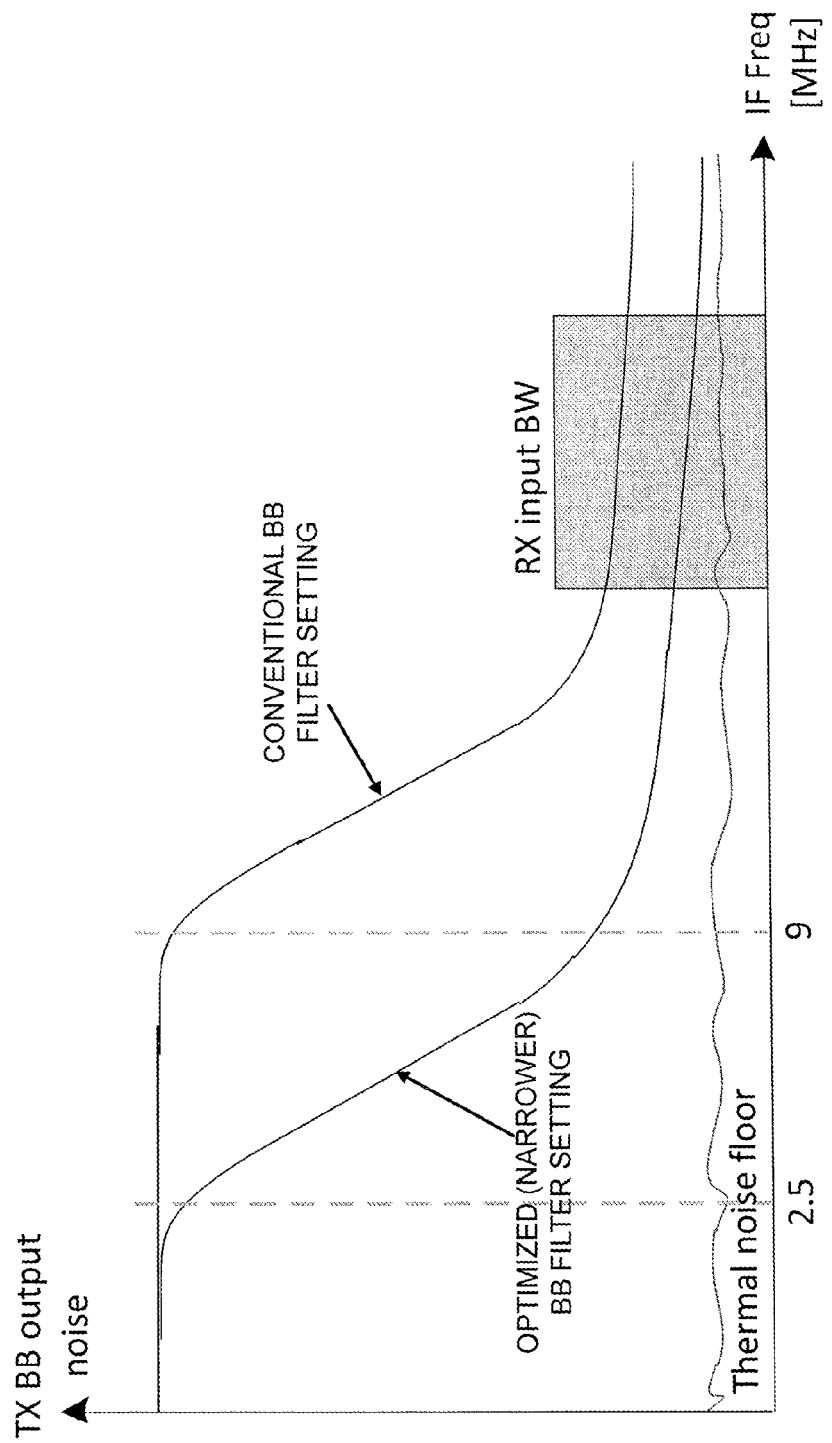
FIG. 21 shows a diagram illustrating a modulator output noise level according to embodiments.

When using an optimization processing as described in relation to FIG. 20, i.e. when modifying a TX configuration as described above, it is possible to obtain a better RF performance with lower current consumption. FIG. 21 shows a diagram illustrating a modulator output noise level for bandwidth setting according to the conventional case (i.e. according to a filter setting reflected in the upper part of FIG. 20) and for bandwidth setting according to the optimized case (i.e. according to a filter setting reflected in the lower part of FIG. 20), i.e. the modulator noise level in different baseband filter setups. By means of changing the BB filter setup from the conventional setting to the optimized setting, the original (i.e. 9-MHz intermediate frequency (IF)) BB filter mode is set to a narrower (2.5-MHz IF) mode. As can be seen in FIG. 21, when (besides the thermal noise level) the TX noise is integrated over the RX input (see box indicated in FIG. 21), the conventional (i.e. broader bandwidth) BB filter setting mode causes more noise compared to optimized (i.e. narrower bandwidth) BB filter setting mode. In other words, a TX performance optimization as described in relation to FIG. 20 results in a reduced noise level for an RX input.

The above situation is in particular present on cellular communication bands such as LTE(A) bands where a duplex gap is narrow but the UE has to support wide bandwidths. It is to be noted that the noise optimization is challenging since a great part of the noise amount originates from active components (e.g. op amps transistors) and thus can be filtered with passive components. Therefore, the noise density typically follows the frequency response of the wanted signal.

According to further embodiments, the effect of the placement of the TX LO i.e. the shift thereof in connection with the TX performance optimization as indicated in FIG. 20 is also considered. Specifically, in case the center of the allowed UL component moves closer to the corresponding DL, the shifted LO may cause a greater amount of noise on its own RX. This may be problematic especially with those LTE bands where a duplex gap is narrow.

Therefore, according to further embodiments, a mechanism is provided which allows a more stringent LO phase noise to meet sufficient DL performance.

That is, according to one embodiment, instead of always performing the TX performance optimization procedure leading to a shift of the LO frequency in the center of the RBs' frequency range, as indicated in the lower part of FIG. 20, the TX configuration optimization is inhibited, i.e. the original wide setup is kept and the LO frequency is maintained at the original frequency.

Alternatively, according to another embodiment, the TX LO frequency shift is only partially towards the RX area and TX filters are tuned only partly. As a consequence of the latter procedure, if the center of the partially narrowed UL allocation is located with a greater distance from own DL area, then TX LO shifting and filter tuning can be performed more efficiently, i.e. without creating too great an amount of noise on its own RX.

Figures 22A, 22B:
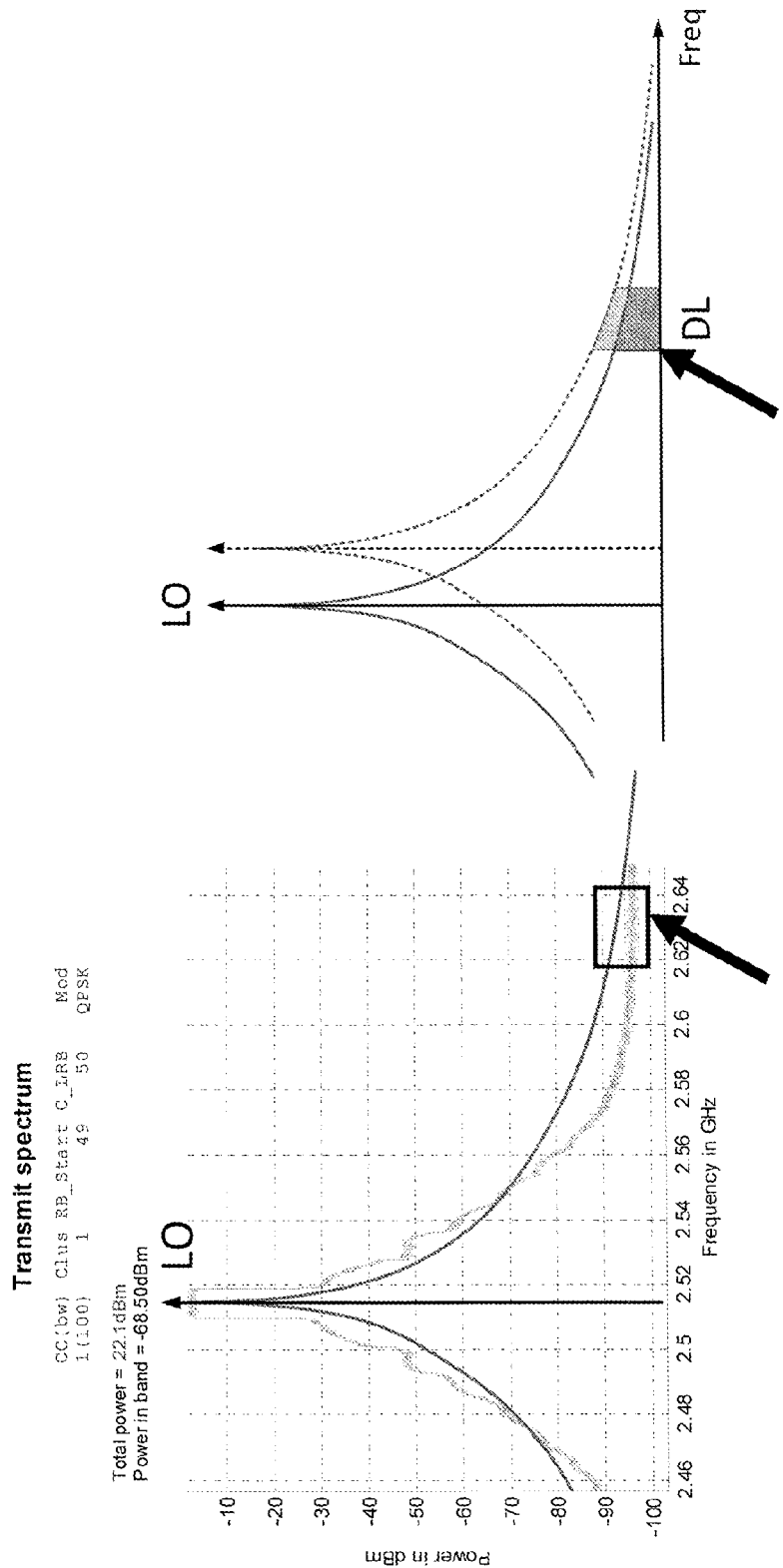
FIG. 22a shows a diagram illustrating an example of an output spectrum of an LTE based communication and FIG. 22b shows a diagram illustrating a TX LO phase noise overlapping with a DL communication.

FIG. 22*a* shows a diagram illustrating an example of an output spectrum of an LTE based communication wherein 50 RBs are used. Indicated in FIG. 22*a* by a box marked by an arrow, a frequency range is shown which is assumed to correspond to a frequency range of an RX part. FIG. 22*b* shows a diagram illustrating a TX LO phase noise overlapping with a DL communication wherein two placements of the LO are assumed. Specifically, FIG. 22*b* shows TX LO phase noise overlapping with DL wherein noise sensed by the receiver side is seen to be increased. In case the center of the allowed UL component moves closer to the corresponding DL, the shifted LO may cause a greater amount of noise on the own RX. This may be problematic especially with those LTE bands where a duplex gap is narrow.

As described above, of embodiments are described to be implemented in UEs and eNBs. However, embodiments are not limited to this. For example, embodiments may be implemented in a wireless modem or the like.

In addition, it is to be noted that a communication element or UE may be configured to comprise elements and/or to conduct functions corresponding to all of the above described embodiments related to a communication element, i.e. may be configured to conduct an autonomous denial and an interference reporting processing. In other words, all processing portions according to FIGS. 7 and 10 may be combined in one communication element, for example.

According to further embodiments, there is provided an apparatus for use in providing interference control in a communication element, comprising interference determination means for determining an interference situation caused between a first communication performed on at least one frequency band and a second communication performed on another frequency band different from the at least one frequency band of the first communication, partial denial processing means for conducting a partial denial procedure for deactivating a dedicated part of resource blocks used for the first communication on the at least one frequency band of the first communication in case the interference situation is determined, and communication continuation processing means for continuing, in parallel to the second communication, the first communication with resources different from the dedicated part of resource blocks deactivated by the partial denial processing portion.

In addition, according to further of embodiments, there is provided an apparatus use for use in providing interference control in a communication network control element, comprising interference situation report processing means for receiving and processing an interference report indicating an interference situation caused between a first communication performed on at least one frequency band and a second communication performed on another frequency band different from the at least one frequency band of the first communication, wherein the interference report comprises at least one of frequency information identifying resources to be deactivated of carriers of the at least one frequency band of the first communication, and/or information related to resource blocks to be deactivated on the first communication, partial denial means for controlling disabling of a dedicated part of resource blocks used for the first communication, the dedicated part of resource blocks being determined on the basis of the interference report, and communication continuation control means for controlling continuation of the first communication with resources different from the dedicated part of resource blocks to be disabled.

For the purpose of the present disclosure as described herein above, it should be noted that
an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present disclosure implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the embodiments being applied thereto, usable communication networks and transmission nodes may be or comprise any device, apparatus, unit or means by which a station, entity or other user equipment may connect to and/or utilize services offered by the access network; such services include, among others, data and/or (audio) visual communication, data download etc.;

a user equipment or communication network element may be any device, apparatus, unit or means which is usable as a user communication device and by which a system user or subscriber may experience services from an access network, such as a mobile phone, a wireless mobile terminal, a personal digital assistant PDA, a smart phone, a personal computer (PC), a laptop computer, a desktop computer or a device having a corresponding functionality, such as a modern chipset, a chip, a module etc., which can also be part of a UE or attached as a separate element to a UE, or the like, wherein corresponding devices or terminals may be, for example, an LTE, an LTE-A, a TETRA (Terrestrial Trunked Radio), an UMTS, a GSM/EDGE etc. smart mobile terminal or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of embodiments in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS). BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Furthermore, as used in this application, the terms, device' or, circuitry' refer to all of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s), software (including digital signal processor(s)), software, and memory (or memories) working together to cause an apparatus, such as a mobile phone or server, to perform various functions) and (c) circuits, such as a microprocessor (or plural microprocessors) or a portion of a microprocessor (or plural microprocessors), that requires/require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device As described above, there is provided a mechanism for controlling communications conducted in multiple frequency bands so as to decrease an interference level between the communications. When an interference situation caused between an UL communication performed on at least one frequency band and a DL communication performed on another frequency band is determined, a partial denial processing is conducted so as to deactivate a dedicated part of resource blocks used for the first communication on the at least one frequency band of the first communication in case the interference situation is determined. The first communication is then continued in parallel to the second communication, on the basis of resources different from the dedicated part of resource blocks deactivated in the partial denial processing.

Although the present disclosure has been described herein before with reference to particular embodiments thereof, embodiments are not limited thereto and various modifications can be made thereto.

What is claimed is:

1. Apparatus for use in providing interference control in a communication element, the apparatus comprising:
an interference determination portion configured to determine an interference situation caused between a first communication performed on at least one frequency band and a second communication performed on another frequency band different from the at least one frequency band of the first communication;
a partial denial processing portion configured to conduct a partial denial procedure for deactivating only a dedicated part of resource blocks used for the first communication on the at least one frequency band of the first communication when an interference situation is determined by the interference determination portion; and
a communication continuation processing portion configured to continue, in parallel to the second communication, the first communication with a remaining part of resource blocks used for the first communication on the at least one frequency band of the first communication that are different from the dedicated part of resource blocks deactivated by the partial denial processing portion.

2. The apparatus according to claim 1, wherein the interference determination portion is configured to determine the interference situation on the basis of a comparison between scheduled or estimated timings for transmissions in the first communication and scheduled or estimated timings for a transmission in the second communication.

3. The apparatus according to claim 1, wherein:
the first communication is one uplink communication, and the second communication is a downlink communication, wherein the interference situation is caused by overlapping or close frequency spectra used by the first and second communications, or
the first communication is one uplink communication, and the second communication is a downlink communication, wherein the interference situation is caused by an $n^{th}$ harmonic of the first communication, or
the first communication comprises at least two uplink communications using carrier aggregation, and the second communication is a downlink communication, wherein the interference situation is caused by an $n^{th}$ harmonic of either of the at least two uplink communications, or
the first communication comprises at least two uplink communications using carrier aggregation, and the second communication is a downlink communication, wherein the interference situation is caused by an interference through intermodulation.

4. The apparatus according to claim 1, wherein the first communication is conducted on one or more frequency bands used for a cellular wireless communication system, and the second communication is conducted on one or more frequency bands used for at least one of industrial, scientific and medical communication, a wireless local area network communication, a cellular wireless communication different from the first communication, and a global navigation satellite system communication.

5. The apparatus according to claim 1, further comprising an interference level estimation portion configured to estimate a level of interference caused by the determined interference situation, to compare the estimated level of interference with a predetermined threshold, and to decide whether to cause the partial denial processing portion to conduct the partial denial procedure when the estimated level of interference is equal to or higher than the predetermined threshold, or to cause the partial denial processing portion to stop the partial denial procedure when the estimated level of interference is lower than the predetermined threshold.

6. The apparatus according to claim 1, wherein the apparatus is comprised in a communication element including a plurality of transceivers configured to conduct in-device co-existence operation by communicating on different frequency bands.

7. The apparatus according to claim 1, wherein the partial denial processing portion is further configured to conduct as the partial denial procedure to deactivate a dedicated part of resource blocks used for the first communication, when two or more frequency bands are used for the first communication, on either one of carriers of the two or more frequency bands of the first communication, an autonomous partial denial operation comprising:
a selection process for selecting the dedicated resource blocks on either one of the two or more frequency bands; and
a denial process for inhibiting a transmission on the dedicated resource blocks for a predetermined time based on the determined interference situation.

8. The apparatus according to claim 1, wherein the partial denial processing portion is further configured to conduct a calculation process for calculating a degree of interference caused by respective resources used for the first communication, and a selection process for selecting the dedicated part of resource blocks on the basis of the calculation process.

9. The apparatus according to claim 1, further comprising:
an interference situation reporting portion configured to cause sending, from the communication element, of an interference report indicating the interference situation and comprising at least one of frequency information identifying resources to be deactivated of carriers of the at least one frequency band of the first communication, and/or information related to the dedicated part of resource blocks to be deactivated; and/or
a deactivation information receiving portion configured to receive information indicating a deactivation of resources used for the first communication, wherein the partial denial processing portion is further configured to use the received information for determining the dedicated part of resources to be deactivated.

10. A method for use in providing interference control in a communication element, the method comprising:
determining an interference situation caused between a first communication performed on at least one frequency band and a second communication performed on another frequency band different from the at least one frequency band of the first communication;
conducting a partial denial procedure for deactivating only a dedicated part of resource blocks used for the first communication on the at least one frequency band of the first communication when an interference situation is determined; and
continuing, in parallel to the second communication, the first communication with a remaining part of resource blocks used for the first communication on the at least one frequency band of the first communication that are different from the dedicated part of resource blocks deactivated in the partial denial procedure.

11. The method according to claim 10, further comprising determining the interference situation on the basis of a comparison between scheduled or estimated timings for transmissions in the first communication and scheduled or estimated timings for a transmission in the second communication.

12. The method according to claim 10, wherein:
the first communication is one uplink communication, and the second communication is a downlink communication, wherein the interference situation is caused by overlapping or close frequency spectra used by the first and second communications, or
the first communication is one uplink communication, and the second communication is a downlink communication, wherein the interference situation is caused by an $n^{th}$ harmonic of the first communication, or
the first communication comprises at least two uplink communications using carrier aggregation, and the second communication is a downlink communication, wherein the interference situation is caused by an $n^{th}$ harmonic of either of the at least two uplink communications, or
the first communication comprises at least two uplink communications using carrier aggregation, and the second communication is a downlink communication, wherein the interference situation is caused by an interference through intermodulation.

13. The method according to claim 10, wherein the first communication is conducted on one or more frequency bands used for a cellular wireless communication system, and the second communication is conducted on one or more frequency bands used for at least one industrial, scientific and medical communication, a wireless local area network communication, a cellular wireless communication different from the first communication, and a global navigation satellite system communication.

14. The method according to claim 10, further comprising:
estimating a level of interference caused by the determined interference situation;
comparing the estimated level of interference with a predetermined threshold; and
deciding whether to conduct the partial denial procedure when the estimated level of interference is equal to or higher than the predetermined threshold, or to stop the partial denial procedure when the estimated level of interference is lower than the predetermined threshold.

15. The method according to claim 10, wherein the method is implemented in a communication element including a plurality of transceivers configured to conduct in-device co-existence operation by communicating on different frequency bands.

16. The method according to claim 10, further comprising conducting as the partial denial procedure to deactivate a dedicated part of resource blocks used for the first communication, when two or more frequency bands are used for the first communication, on either one of carriers of the two or more frequency bands of the first communication, an autonomous partial denial operation comprising:
a selection process for selecting the dedicated resource blocks on either one of the two or more frequency bands; and
a denial process for inhibiting a transmission on the dedicated resource blocks for a predetermined time based on the determined interference situation.

17. The method according to claim 10, further comprising conducting a calculation process for calculating a degree of interference caused by respective resources used for the first communication, and a selection process for selecting the dedicated part of resource blocks on the basis of the calculation process.

18. The method according to claim 10, further comprising:
sending from the communication element, an interference report indicating the interference situation and comprising at least one of frequency information identifying resources to be deactivated of carriers of the at least one frequency band of the first communication, and/or information related to the dedicated part of resource blocks to be deactivated; and/or
receiving information indicating a deactivation of resources used for the first communication, and using the received information in the partial denial procedure for determining the dedicated part of resources to be deactivated.

19. A computer program product comprising a non-transitory computer-readable storage medium having computer readable instructions stored thereon, the computer readable instructions being executable by a computerized device to cause the computerized device to perform a method including the steps of:
determining an interference situation caused between a first communication performed on at least one frequency band and a second communication performed on another frequency band different from the at least one frequency band of the first communication;
conducting a partial denial procedure for deactivating only a dedicated part of resource blocks used for the first communication on the at least one frequency band of the first communication when of an interference situation is determined; and
continuing, in parallel to the second communication, the first communication with a remaining part of resource blocks used for the first communication on the at least one frequency band of the first communication that are different from the dedicated part of resource blocks deactivated in the partial denial procedure.

20. The computer program product according to claim 19, wherein the computer program product is directly loadable into the internal memory of the computerized device and/or transmittable via a network by means of at least one of upload, download and push procedures.

21. A portable communication device, comprising:
a plurality of transceivers configured to conduct in-device co-existence operation by communicating on different frequency bands;
an interference determination portion configured to determine an interference situation caused between a first communication performed on at least a first one of the frequency bands and a second communication performed on a second one of the frequency bands different from the first frequency band of the first communication;
a partial denial processing portion configured to deactivate only a dedicated part of resource blocks used for the first communication on the first frequency band when an interference situation is determined by the interference determination portion; and
a communication continuation processing portion configured to continue, in parallel to the second communication on the second frequency band, the first communication with a remaining part of resource blocks used for the first communication on the first frequency band that are different from the dedicated part of resource blocks deactivated by the partial denial processing portion.

* * * * *